United States Patent
Tohidi et al.

(10) Patent No.: US 11,202,926 B2
(45) Date of Patent: Dec. 21, 2021

(54) FIRE MONITORING

(71) Applicant: One Concern, Inc., Menlo Park, CA (US)

(72) Inventors: Ali Tohidi, Palo Alto, CA (US); Nicholas McCarthy, Palo Alto, CA (US); Yawar Aziz, Palo Alto, CA (US); Nicole Hu, Mountain View, CA (US); Ahmad Wani, Mountain View, CA (US); Timothy Frank, Stanford, CA (US)

(73) Assignee: ONE CONCERN, INC., Menlo Park, CA (US)

(*) Notice: Subject to any disclaimer, the term of this patent is extended or adjusted under 35 U.S.C. 154(b) by 137 days.

(21) Appl. No.: 16/197,503

(22) Filed: Nov. 21, 2018

(65) Prior Publication Data

US 2020/0155881 A1    May 21, 2020

(51) Int. Cl.
*A62C 3/02* (2006.01)
*G06N 20/10* (2019.01)
(Continued)

(52) U.S. Cl.
CPC .............. *A62C 3/0271* (2013.01); *G01W 1/10* (2013.01); *G06F 16/587* (2019.01); *G06F 16/9038* (2019.01); *G06N 20/10* (2019.01)

(58) Field of Classification Search
CPC .................... G06F 16/587; A62C 3/0271
(Continued)

(56) References Cited

U.S. PATENT DOCUMENTS

| 8,189,877 B2* | 5/2012 | Asner | G06K 9/00657 |
| | | | 382/110 |
| 8,680,994 B2* | 3/2014 | Leppanen | G06K 9/00657 |
| | | | 340/540 |

(Continued)

FOREIGN PATENT DOCUMENTS

| CN | 109993938 | 7/2019 |
| KR | 20190117947 | 10/2019 |
| WO | 2020106720 | 3/2014 |

OTHER PUBLICATIONS

Tehrany et al. "A novel ensemble modeling approach for the spatial prediction of tropical forest fire susceptibility using LogitBoost machine learning classifier and multi-source geospatial data", Sep. 11, 2018, Theoretical and Applied Climatology, pp. 637-653. (Year: 2018).*

(Continued)

*Primary Examiner* — Ricky Ngon
(74) *Attorney, Agent, or Firm* — Schwegman Lundberg & Woessner, P.A.

(57) ABSTRACT

Tools for fire monitoring are presented. One method includes an operation for accessing values of features for monitoring a fire in a region. The features include satellite images at a first resolution, vegetation information, and weather data. Further, each satellite image includes first cells associated with the geographical region and the first resolution defines a first size of each first cell. The method further includes generating a map of the geographical region comprising a plurality of second cells having a second size, which is smaller than the first size. Additionally, the method includes operations for estimating, using a machine-learning model, probability values for the second cells in the map based on the features, each probability value indicating if the second cell contains an active fire, and for updating the map (Continued)

based on the probability values for the second cells. The map is presented in a user interface.

20 Claims, 27 Drawing Sheets

(51) Int. Cl.
*G06F 16/9038* (2019.01)
*G06F 16/587* (2019.01)
*G01W 1/10* (2006.01)

(58) Field of Classification Search
USPC .............................................................. 702/2
See application file for complete search history.

(56) References Cited

U.S. PATENT DOCUMENTS

| | | | | |
|---|---|---|---|---|
| 8,775,119 B2* | 7/2014 | Rojas | ..................... | G01B 21/28 |
| | | | | 702/156 |
| 2002/0026431 A1 | 2/2002 | Pedersen et al. | | |
| 2005/0103506 A1* | 5/2005 | Warrack | ............... | A62C 3/0271 |
| | | | | 169/43 |
| 2005/0189122 A1* | 9/2005 | Wippich | .............. | A62C 3/0271 |
| | | | | 169/43 |
| 2006/0209184 A1 | 9/2006 | Chen | | |
| 2008/0309502 A1* | 12/2008 | Boccia | ................. | A62C 3/0271 |
| | | | | 340/578 |
| 2010/0194893 A1* | 8/2010 | Graeser | ................ | A62C 3/0271 |
| | | | | 348/159 |
| 2012/0261144 A1* | 10/2012 | Vian | .................... | G05D 1/0088 |
| | | | | 169/43 |
| 2013/0094699 A1 | 4/2013 | Ko et al. | | |
| 2014/0027131 A1* | 1/2014 | Kawiecki | ............. | G08B 17/005 |
| | | | | 169/45 |
| 2015/0278603 A1* | 10/2015 | Boriah | ................. | G06K 9/0063 |
| | | | | 382/103 |
| 2015/0323699 A1* | 11/2015 | Gariepy | ................. | G05B 15/00 |
| | | | | 702/2 |
| 2017/0100615 A1* | 4/2017 | Doten | ................... | G01S 7/4802 |
| 2017/0249056 A1* | 8/2017 | Rainey | ............ | G06Q 10/06313 |
| 2019/0176987 A1* | 6/2019 | Beecham | ............... | B64C 39/024 |

OTHER PUBLICATIONS

Satir et al., "Mapping regional forest fire probability using artificial neural network model in a Mediterranean forest ecosystem", Sep. 11, 2015, Geomatics, Natural Hazards and Risk, vol. 7, No. 5, pp. 1645-1658. (Year: 2015).*

Nguyen et al., "Spatial pattern assessment of tropical forest fire danger at Thuan Chau area (Vietnam) using GIS-based advanced machine learning algorithms: A comparative study", May 29, 2018, Ecological Informatics 446, pp. 74-85. (Year: 2018).*

Bui et al., "GIS-based spatial prediction of tropical forest fire danger using a new hybrid machine learning method", Aug. 30, 2018, Ecological Informatics 48, pp. 104-116. (Year: 2018).*

Sachdeva et al., "GIS-based evolutionary optimized Gradient Boosted Decision Trees for forest fire susceptibility mapping", Mar. 12, 2018, Nat Hazards 92: pp. 1399-1418. (Year: 2018).*

Bui et al., "A hybrid artificial intelligence approach using GIS-based neural-fuzzy inference system and particle swarm optimization for forest fire susceptibility modeling at a tropical area", Nov. 23, 2016, Agricultural and Forest Meteorology 233, pp. 32-44. (Year: 2016).*

Rodrigues et al., "An insight into machine-learning algorithms to model human-caused wildfire occurrence", Apr. 2, 2014, Environmental Modeling & Software 57, pp. 192-201. (Year: 2014).*

"International Application Serial No. PCT US2019 062215, International Search Report dated Jan. 30, 2020", 2 pgs.

"International Application Serial No. PCT US2019 062215, Written Opinion dated Jan. 30, 2020", 5 pgs.

* cited by examiner

FIRE MONITORING

TECHNICAL FIELD

The subject matter disclosed herein generally relates to methods, systems, and machine-readable storage media for managing fire operations and, more particularly, to methods, systems, and machine-readable storage media for monitoring active fires.

BACKGROUND

When fighting large forest fires, it is important to understand the spread of the fire as well as predict the evolution of the fire based on current conditions. If fire managers know where the fire is and where the fire is going, the fire managers may make decisions on how to fight the fire or evacuate people from danger areas in order to avoid life and property losses.

Current methods for monitoring fire provide very limited information. For example, some estimators provide one update about the fire situation every 24 hours, and then the planning is done for the next 24 hours. However, conditions may change quickly (e.g., weather changes) that may alter the fire path, but the fire manager will not get updates for a long time, which complicates the decision-making for fighting the fire and evacuating people. Additionally, most times the fire managers do not have information about residents in the path of the fire, such as number of people, age distribution, hospitals, schools, senior residences, etc.

Firefighting strategies usually have a tree-structure management chain where goals are set at the top and the implementation is decided further down at the lower levels to try to meet the management goals. But if the goals handed down from the top do not have the specifics about locations where to fight the fire in the timelines for fighting the fire, the decision-making will be ineffective.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
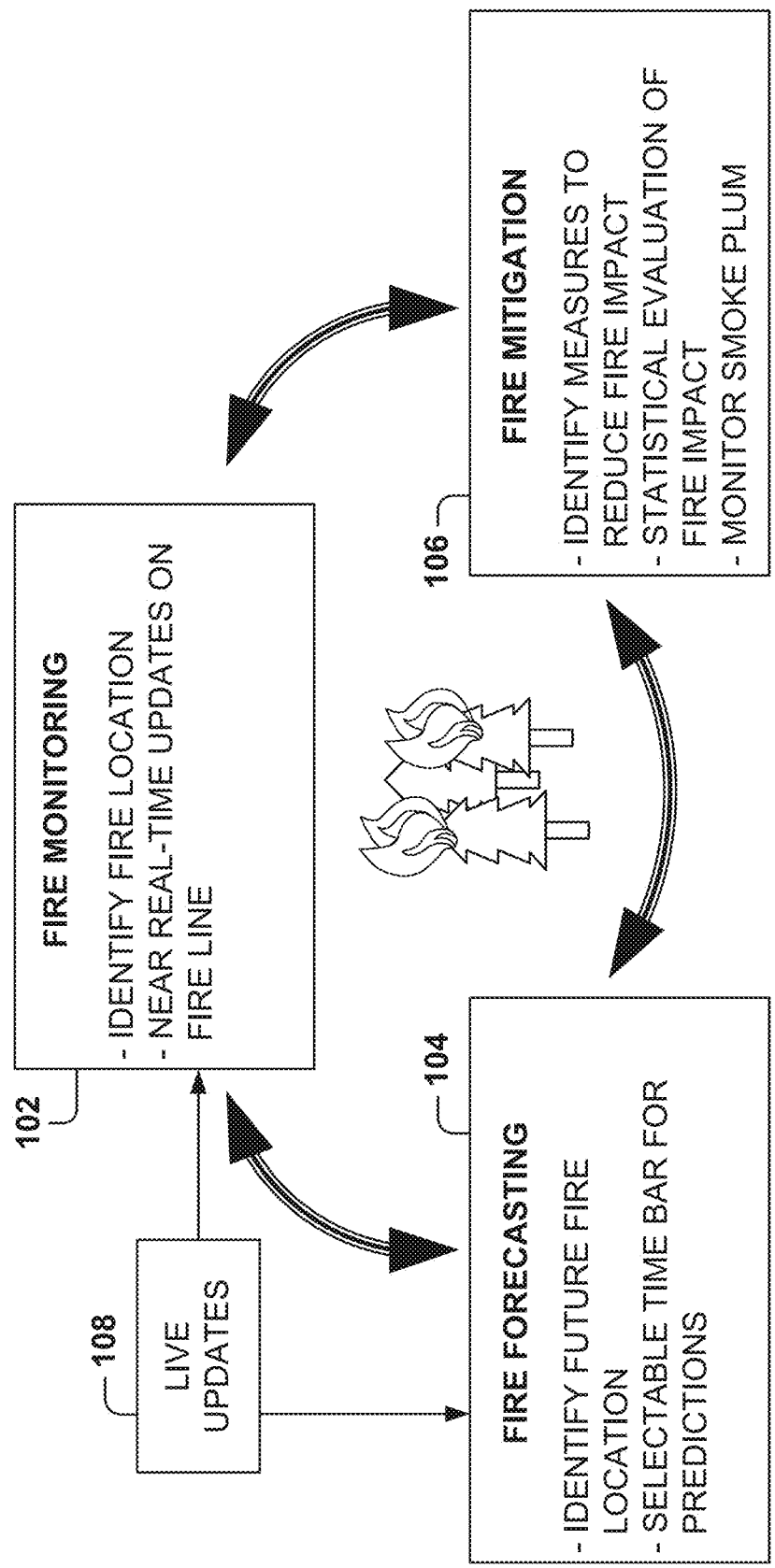
FIG. 1 illustrates the components of a comprehensive fire management strategy, according to some example embodiments.

Example methods, systems, and computer programs are directed to tools for fire monitoring. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A fire monitoring tool provides information about the state of a wildfire. The information may be presented in a user interface that includes maps with details about the fire scar, the fire perimeter, weather conditions (e.g., wind), instability regions, structures, etc. The fire monitoring tool is configured to receive updates and the fire state is updated quickly to reflect the current situation without having to wait a day for the next fire status update.

In some embodiments, satellite images are used to monitor the fire. The cells of the fire monitoring map have higher resolution than the satellite images, and a machine-learning tool is used to improve the resolution provided by the satellite images by combining the image information with additional fire-related data (e.g., weather data, vegetation data, etc.).

A fire forecasting tool generates forecasts for the evolution of the fire, which include the evolution of the fire perimeter and possible new ignition sites. The fire forecasting information may be presented on a user interface that includes maps with the details about the fire evolution. The user interface includes a time bar where the user may select the time for the forecast. The fire forecasting tool utilizes the information from the fire monitoring tool to provide forecasts based on the current available information. Additionally, the fire forecasting tool may receive status updates regarding the fire situation and update the fire forecast right away to obtain an updated fire forecast.

In one embodiment, a method includes an operation for accessing a database to obtain values for a plurality of features associated with a fire in a geographical region. The plurality of features include one or more satellite images at a first resolution, vegetation information for the geographical region, and weather data for the geographical region. Each satellite image comprises a plurality of first cells associated with the geographical region, the first resolution defining a first size of each first cell. The method further includes an operation for generating a map of the geographical region. The map comprises a plurality of second cells having a second size, where the second size is smaller than the first size. Additionally the method includes estimating, using a machine-learning model, probability values for the second cells in the map based on the plurality of features. Each probability value indicates if the second cell contains an active fire. Further, the method includes operations for updating the map of the geographical region based on the probability values for the second cells, and for causing presentation of the map in a user interface.

In another embodiment, a system includes a memory comprising instructions and one or more computer processors. The instructions, when executed by the one or more computer processors, cause the one or more computer processors to perform operations that include accessing a database to obtain values for a plurality of features associated with a fire in a geographical region. The plurality of features comprise one or more satellite images at a first resolution, vegetation information for the geographical region, and weather data for the geographical region. Each satellite image comprises a plurality of first cells associated with the geographical region, where the first resolution defines a first size of each first cell. The operations also include generating a map of the geographical region, the map comprising a plurality of second cells having a second size, where the second size is smaller than the first size. The operations further include estimating, using a machine-learning model, probability values for the second cells in the map based on the plurality of features, each probability value indicating if the second cell contains an active fire. The operations further include updating the map of the geographical region based on the probability values for the second cells, and causing presentation of the map in a user interface.

In yet another embodiment, a machine-readable storage medium (e.g., a non-transitory storage medium) includes instructions that, when executed by a machine, cause the machine to perform operations that include accessing a database to obtain values for a plurality of features associated with a fire in a geographical region. The plurality of features includes one or more satellite images at a first resolution, vegetation information for the geographical region, and weather data for the geographical region. Each satellite image comprises a plurality of first cells associated with the geographical region, the first resolution defining a first size of each first cell. The operations further include generating a map of the geographical region. The map comprises a plurality of second cells having a second size, where the second size is smaller than the first size. Additionally, the operations include estimating, using a machine-learning model, probability values for the second cells in the map based on the plurality of features. Each probability value indicates if the second cell contains an active fire. Further, the operations include updating the map of the geographical region based on the probability values for the second cells, and causing presentation of the map in a user interface.

In one example embodiment, a method is provided for receiving, via a computer network and by a fire forecasting system, fire-related inputs including vegetation data, topography data, weather data, and fire-monitoring information including data identifying a physical shape of a fire burning in a region. Further, the method generates, by the fire forecasting system, fire forecast data for the region based on the fire-related inputs. The fire forecast data describes a state of the fire in the region at multiple times in the future. The state of the fire comprises a fire perimeter, a fire line intensity, and a flame height. Additionally, the method includes receiving, via the computer network, updated fire-monitoring information regarding a current state of the fire in the region. The fire forecasting system modifies the fire forecast data based on the updated fire-monitoring information. Further, the method causes presentation, in a user interface, of a fire forecast based on the fire forecast data.

In another example embodiment, a fire forecasting system includes a memory comprising instructions and one or more computer processors. The instructions, when executed by the one or more computer processors, cause the one or more computer processors to perform operations that include receiving, via a computer network and by a fire forecasting system, fire-related inputs including vegetation data, topography data, weather data, and fire-monitoring information including data identifying a physical shape of fire burning in a region. The operations further include generating, by the fire forecasting system, fire forecast data for the region based on the fire-related inputs. The fire forecast data describes a state of the fire in the region at multiple times in the future, and the state of the fire comprises a fire perimeter, a fire line intensity, and a flame height. The operations further include receiving, via the computer network, updated fire-monitoring information regarding a current state of the fire in the region, and modifying, by the fire forecasting system, the fire forecast data based on the updated fire-monitoring information. Additionally, the operations include causing presentation in a user interface of a fire forecast based on the fire forecast data.

In yet another example embodiment, a machine-readable storage medium (e.g., a non-transitory storage medium)

includes instructions that, when executed by a machine, cause the machine to perform operations that include receiving, via a computer network and by a fire forecasting system, fire-related inputs including vegetation data, topography data, weather data, and fire-monitoring information including data identifying a physical shape of fire burning in a region The operations further include generating, by the fire forecasting system, fire forecast data for the region based on the fire-related inputs. The fire forecast data describes a state of the fire in the region at multiple times in the future, and the state of the fire comprises a fire perimeter, a fire line intensity, and a flame height. The operations further include receiving, via the computer network, updated fire-monitoring information regarding a current state of the fire in the region. Further, the operations include modifying, by the fire forecasting system, the fire forecast data based on the updated fire-monitoring information, and causing presentation in a user interface of a fire forecast based on the fire forecast data.

In an example embodiment, a method includes estimating, by a fire management system, a fire state in a region and a forecast of an evolution of a fire at a plurality of times. The fire management system provides a user interface for presenting fire information based on the estimated fire state and the forecast. The user interface includes a map of the region, a graphical representation of the fire information, and a time bar for selecting a time of the plurality of times for the fire information. Further, the method includes receiving, via the user interface, a selection of the time period for the presentation of the fire information. The selected time may be a past time, a present time, or a future time. The fire management system causes presentation in the user interface of the fire information for the selected time.

In another embodiment, a system includes a memory comprising instructions and one or more computer processors. The instructions, when executed by the one or more computer processors, cause the one or more computer processors to perform operations that include estimating, by a fire management system, a fire state in a region and a forecast of an evolution of a fire at a plurality of times. The operations also include providing, by the fire management system, a user interface presenting fire information based on the estimated fire state and the forecast. The user interface includes a map of the region, a graphical representation of the fire information, and a time bar for selecting the time period for the presentation of the fire information. Further, the operations include receiving, via the user interface, a selection of the time for the fire information. The selected time may be a past time, a present time, or a future time. The operations further include causing presentation in the user interface of the fire information for the selected time.

In yet another embodiment, a machine-readable storage medium (e.g., a non-transitory storage medium) includes instructions that, when executed by a machine, cause the machine to perform operations that include estimating, by a fire management system, a fire state in a region and a forecast of an evolution of a fire at a plurality of times. The operations also include providing, by the fire management system, a user interface presenting fire information based on the estimated fire state and the forecast. The user interface includes a map of the region, a graphical representation of the fire information, and a time bar for selecting a time of the plurality of times for the fire information. Additionally, the operations include receiving, via the user interface, a selection of the time period for the presentation of the fire information. The selected time may be a past time, a present time, or a future time. The operations further include causing presentation in the user interface of the fire information for the selected time.

FIG. 1 illustrates the components of a comprehensive fire management strategy, according to some example embodiments. Fire monitoring 102 identifies the current location of the fire, and the fire location is updated based on live updates 108 containing fire-related data. The live updates 108 may be of different kinds, such as satellite images, reports from people on the fire front, social media information and images, emergency response lines (e.g., 911, etc.).

Fire forecasting 104 identifies the future location of the fire based on the current fire location and additional data that provides information on how the fire will spread. The additional data may include weather information, topography of the area, types of fire fuel, etc. In some example embodiments, a detailed map is provided with the fire-forecast information. The detailed map includes a time bar with a timescale that may be slid back and forth to select the time period, e.g., fire forecast at one hour, four hours, 12 hours, 24 hours, 48 hours, etc.

Fire forecasting 104 assists the fire manager in determining the impact of the wildfire to the communities in the fire's path in order to make well-informed decisions on how to fight the fire and evacuate people. Further, evacuation routes may be identified for the safe transport of people and firefighting equipment.

Fire forecasting 104 may also receive live updates 108 in order to continuously update the fire forecast. Fire managers do not have to wait 24 hours for the next prediction based on the current available data.

Fire mitigation 106 identifies measures to reduce fire impact from future fires. Fire mitigation 106 is a planning tool for community managers to prepare for the impact of possible fires in their communities. By generating a statistical evaluation of the fire impact, community managers are able to identify measures to reduce the negative effects of fires. Additionally, fire mitigation 106 provides a tool for monitoring the smoke plan so controlled vegetation burns do not cause adverse health effects on the community.

Often, when firefighters arrived at a fire, they are given a map with an approximate line of where the fire is, but the information tends to lack accuracy; sometimes they do not even get a map, but just an approximate location of the fire. The tools provided herein give firefighters the ability to obtain a detailed description of the location of the fire with live updates to continuously reassess the fire location (e.g., by processing satellite imagery) and estimates for the evolution of the fire perimeter.

Figure 2:
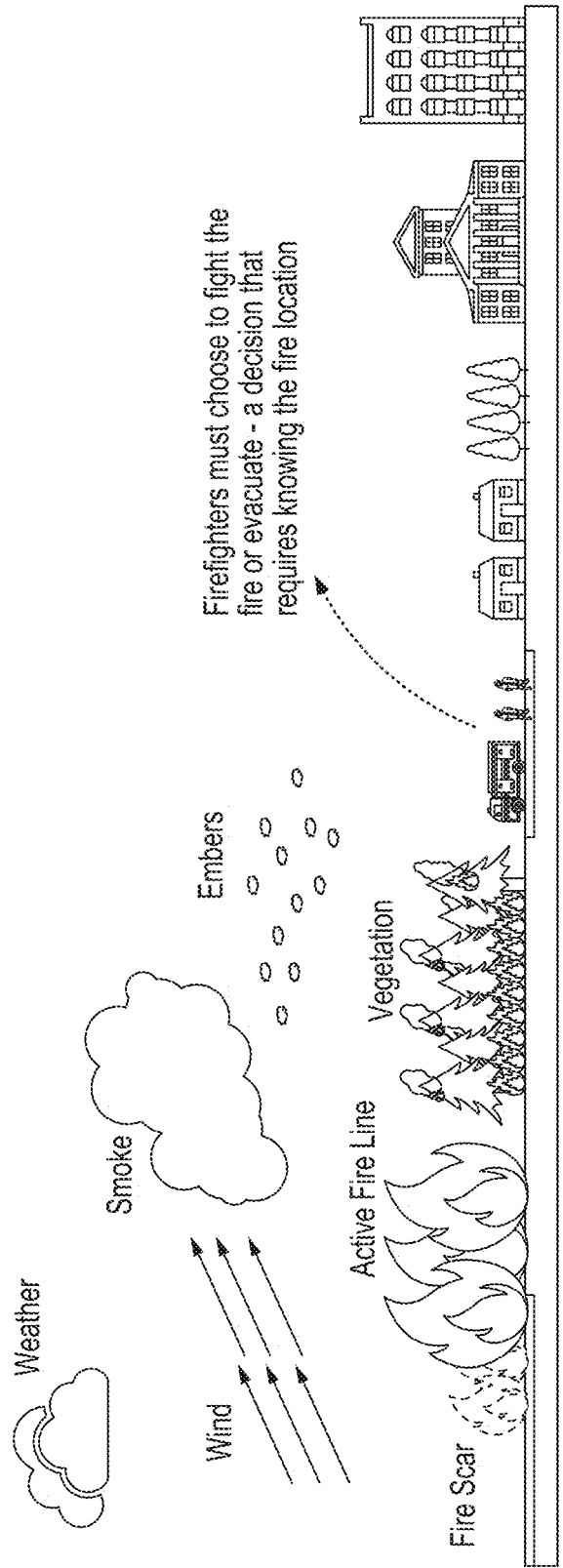
FIG. 2 illustrates example factors when planning for file monitoring, according to some example embodiments.

FIG. 2 illustrates example factors when planning for file monitoring 102, according to some example embodiments. Fire monitoring 102 tracks the active fire line based on current conditions, such as current fire location, weather data (e.g., wind force and direction, clouds, temperature), type of fire fuel in the path of the fire (e.g., bushes, trees, rocky terrain, urban areas), etc. Fire monitoring 102 also monitors the area impacted by the embers that may change the active fire line (e.g., generation of new fire spots).

Fire monitoring 102 assists firefighters to make decisions regarding fighting the fire and assisting people in evacuations. Knowing where the fire is (and where the fire is going to be) is critical information for making these decisions.

In some example embodiments, satellite image information is used to determine the current location of the fire. Although the satellites provide low-resolution images, embodiments of fire monitoring 102 utilize techniques to increase the resolution on the map of the location of the fire.

This way, fire monitoring 102 is more accurate than previous solutions and provides faster updates based on the live data.

Fire forecasting assists firefighters in making decisions by providing the information on where the fire is going to be in the near future. For example, firefighters often make decisions on evacuations based on where the fire is going to be in the next 12 or 24 hours. Thus, accurate information for fire forecasting in those time periods is critical to make those life-saving decisions.

Figure 3:
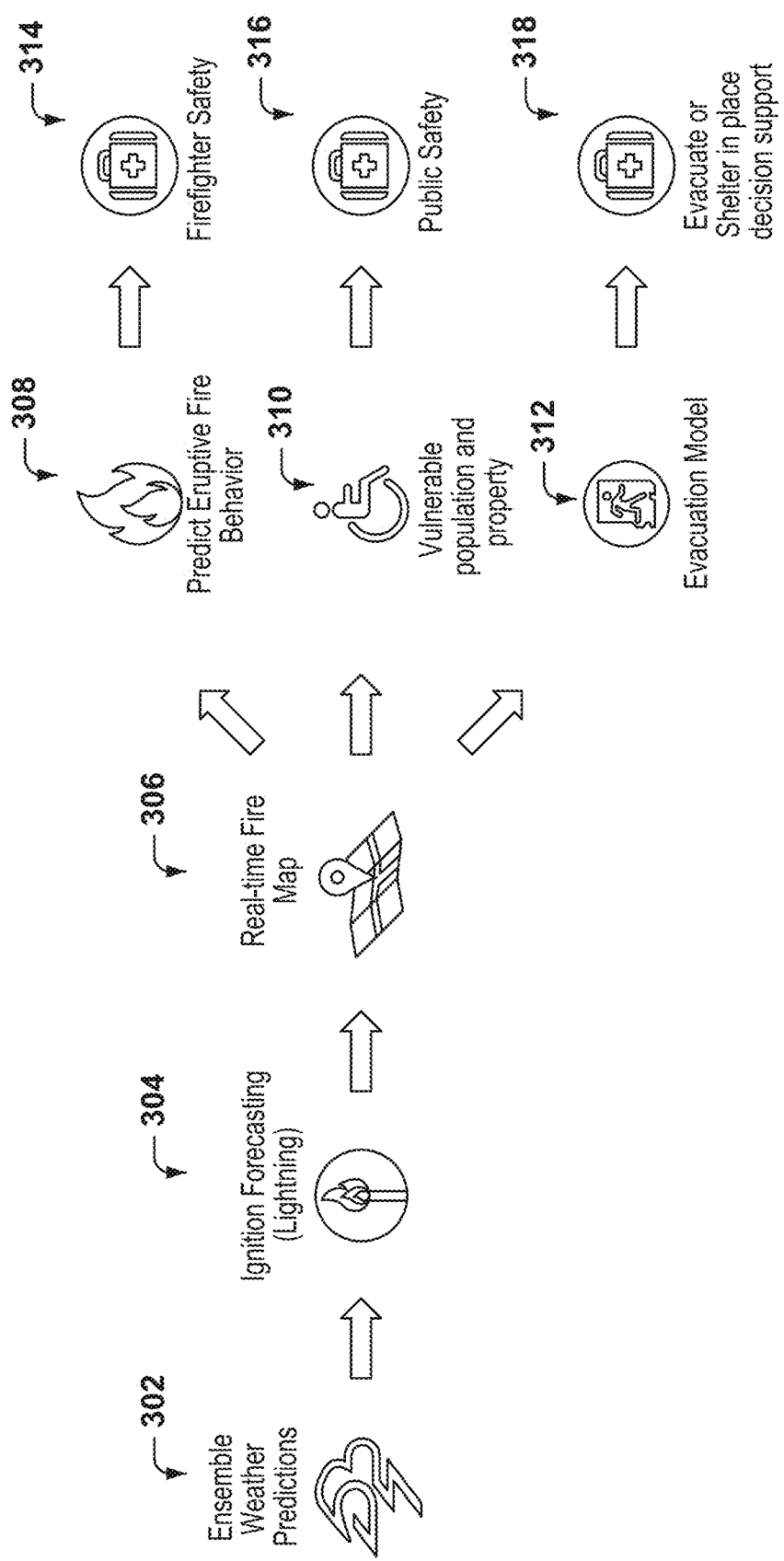
FIG. 3 illustrates decision-making and firefighter-safety considerations, performed by a computer system, when monitoring active fires, according to some example embodiments.

FIG. 3 illustrates decision-making and firefighter-safety considerations, performed by a computer system, when monitoring active fires, according to some example embodiments. The live fire view, in near real-time, allows for better decision-making and improved firefighter safety.

Initially, the weather predictions 302 are gathered, and an ignition forecasting method 304 predicts where fire may ignite, e.g., resulting from lighting or embers traveling in the air. The real-time fire map is then calculated 306 that shows the current location of the fire. After calculating 306 the real-time fire map, the behavior of the fire may be predicted 308, as well as which population and property are vulnerable 310 to the fire, and the planning of evacuating model 312 for people and animals.

As a result of these activities, firefighter safety 314, public safety 316, and decisions about evacuation or sheltering in place 318 are easier to made because the response teams have accurate information.

For example, in case of emergency, community managers are able to come up with a plan to prioritize rescue efforts, identifying a timeline of evacuation for different areas. Police and other officials may lack resources to assist a large number of residents in the path of the fire. By better understanding the evolution of the fire, community resources can be scheduled in order to assist people with urgent needs.

Figure 4:
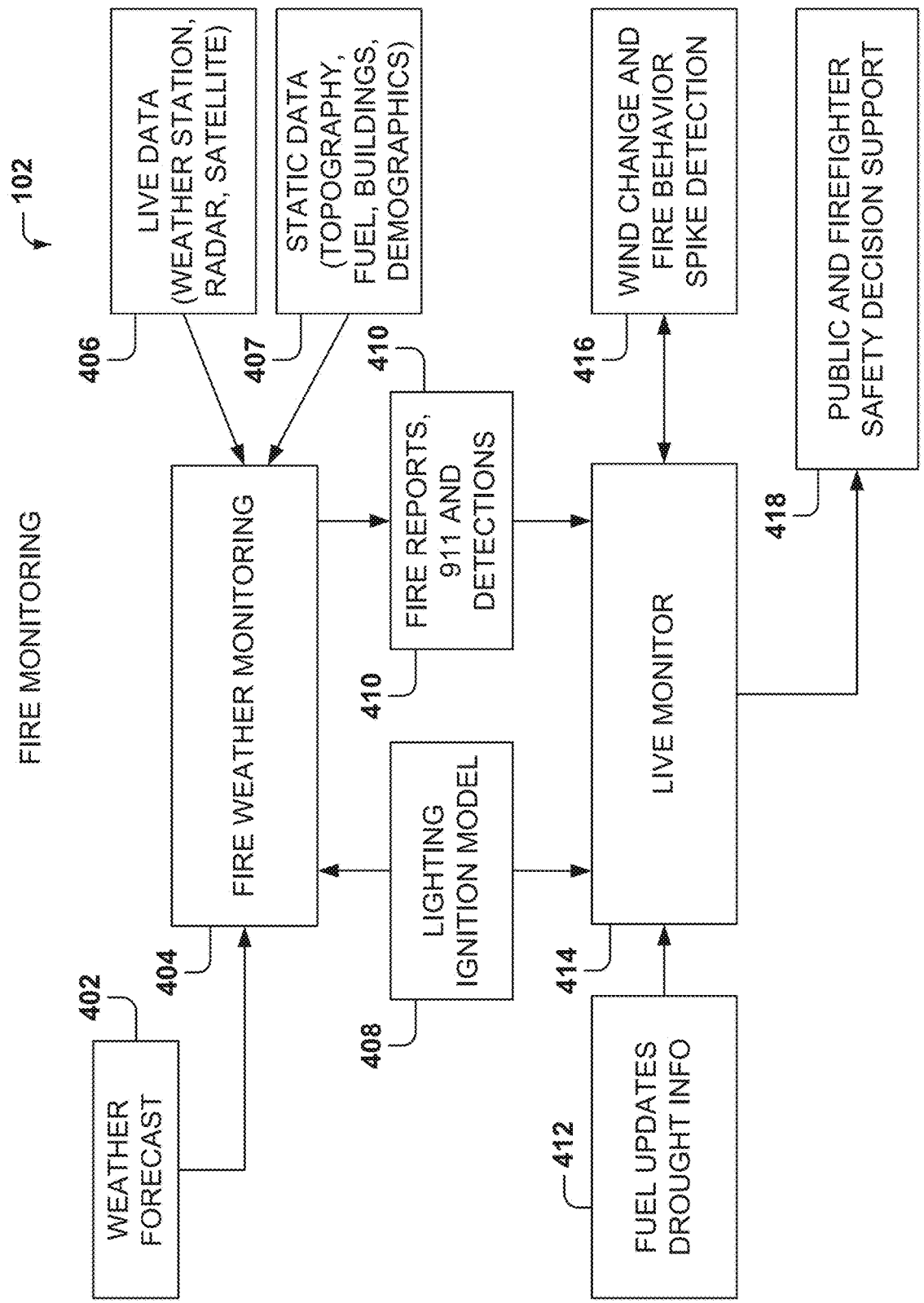
FIG. 4 is a high-level hardware architecture for fire monitoring, according to some example embodiments.

FIG. 4 is a high-level hardware architecture for fire monitoring, according to some example embodiments. About 1% of fires cause most of the damage to people and property, and these are the fires that grow larger than a hundred hectares. The behavior of these large fires is usually difficult to predict due to changing conditions (e.g., weather) and their large size. These fires may last a month or more and require enormous quantities of resources to fight the fire and to keep the population safe.

The fire weather monitoring module 404 analyzes multiple sources of fire-related information and provides information about the state of the fire. The fire weather monitoring module 404 takes multiple inputs, including the weather forecast 402, live data 406 (e.g., weather station radar, satellite imagery, people observations, etc.), and static data 407 (e.g., topography, fire fuel, buildings in the area, demographics of the residents, etc.).

In some example embodiments, the satellite data is combined with fire models every 10 minutes to increase the resolution of the satellite images of the fire, a process that is referred to herein as satellite downscaling. In reality, the resolution of the images is not increased, but the resolution of the output indicating if a cell (e.g., corresponding to a pixel) is on fire is higher than the pixels in the satellite image, although for simplicity of description it may be said that the resolution provided by the satellite images is increased, and satellite downscaling refers to the decrease of the map scale compared to the scale of the satellite images.

In some example embodiments, the fire model is a machine-learning program that utilizes a plurality of features for predicting the fire state. As used herein, "fire state" refers to any information about the fire. In some embodiments, the fire state includes information by geographic cell, and the information includes whether the cell is on fire, vegetation in the cell, topography, etc. The features for the machine-learning program include, at least, weather, fuel type, topography, building structures, etc. Data from previous fires is utilized to train the machine-learning programs.

There are, at least, two types of satellites that provide image information: geostationary satellites and non-stationary low-orbit satellites. The low-orbit satellites provide better image resolution of fires because these satellites are closer to the ground than the geostationary satellites, but since the low-orbit satellites are in motion, updates are not as frequent as with the geostationary satellites. The National Aeronautics and Space Administration (NASA) and the National Oceanic and Atmospheric Administration (NOAA) are two sources of satellite data.

The information from the fire weather monitoring module 404 is used by the lightning ignition model 408 and for generating fire reports 410 for community resources that fight the fire or assist people during the fire. The lightning ignition model 408 predicts where a fire may ignite, and the probability of the fire igniting.

The live monitor 414 provides user interfaces (e.g., on a display or printed on paper) that enable the view of the fire and its evolution. Additionally, different parameters may be configured to obtain different views and hide or show different factors (e.g., winds, topography, fire fuel).

The live monitor 414 receives inputs from the lightning ignition model 408, fire reports 410, fuel updates and drought information (e.g., drought maps) 412, and wind change and fire behavior spike detection 416. Further, the live monitor 414 generates information for public and firefighter safety decision support 418, which may be presented in a report or a user interface.

In some example embodiments, the live monitor 414 may use flood information to increase the accuracy of the fire prediction models. This way, a multi-hazard solution is provided that takes into account the effects of flooding when fighting fire. After a flood, the terrain may change, such as vegetation or the course of water ways. Further, after a fire, the lack of vegetation may increase the risk of flooding or landslides. By taking a multi-hazard approach, community managers are able to better decide how to plan the use of available resources for lower impact from fires and floods.

Figure 5:
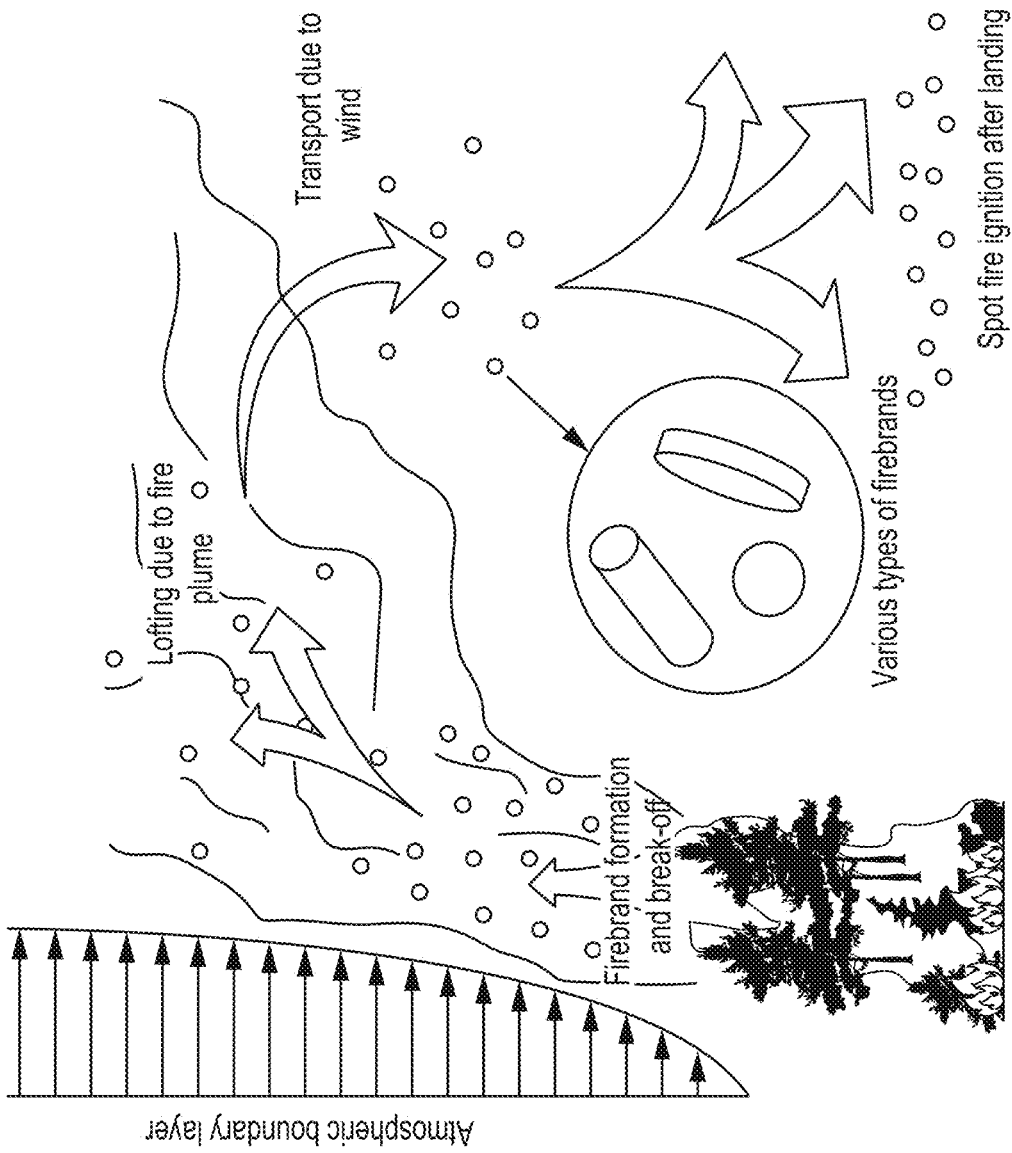
FIG. 5 illustrates ember modeling, by the computer system, to determine fire spread, according to some example embodiments.

FIG. 5 illustrates ember modeling, by the computer system, to determine fire spread, according to some example embodiments. Ember includes small pieces of burning material (e.g., bark, debris) that fly into the air, travel based on the wind direction, and then fall on the ground, causing the possibility of starting fires at a distance from the current burning area. In simple terms, when a structure or vegetation burns due to thermo-mechanical effects, the material loses its structural integrity and breaks off in the form of tiny particles (ember). The embers get lofted through the fire plume and are transported through the smoke to land in other places and possibly ignite other fires.

In some example embodiments, ember modeling is used to determine the spread of fire by embers, which is the primary method of fire spread in urban areas. Instead of just thinking of fire spread as an expanding borderline, ember modeling provides a more realistic approach to fire spread. Some prior models treat these ember particles as compact forms (e.g., a sphere), which does not match well to reality, causing many prediction errors. In reality, embers may take multiple forms (e.g., cylindrical, spherical, ellipsoidal), and ember modeling takes into consideration multiple forms for generating the ignition forecasts.

Figure 6:
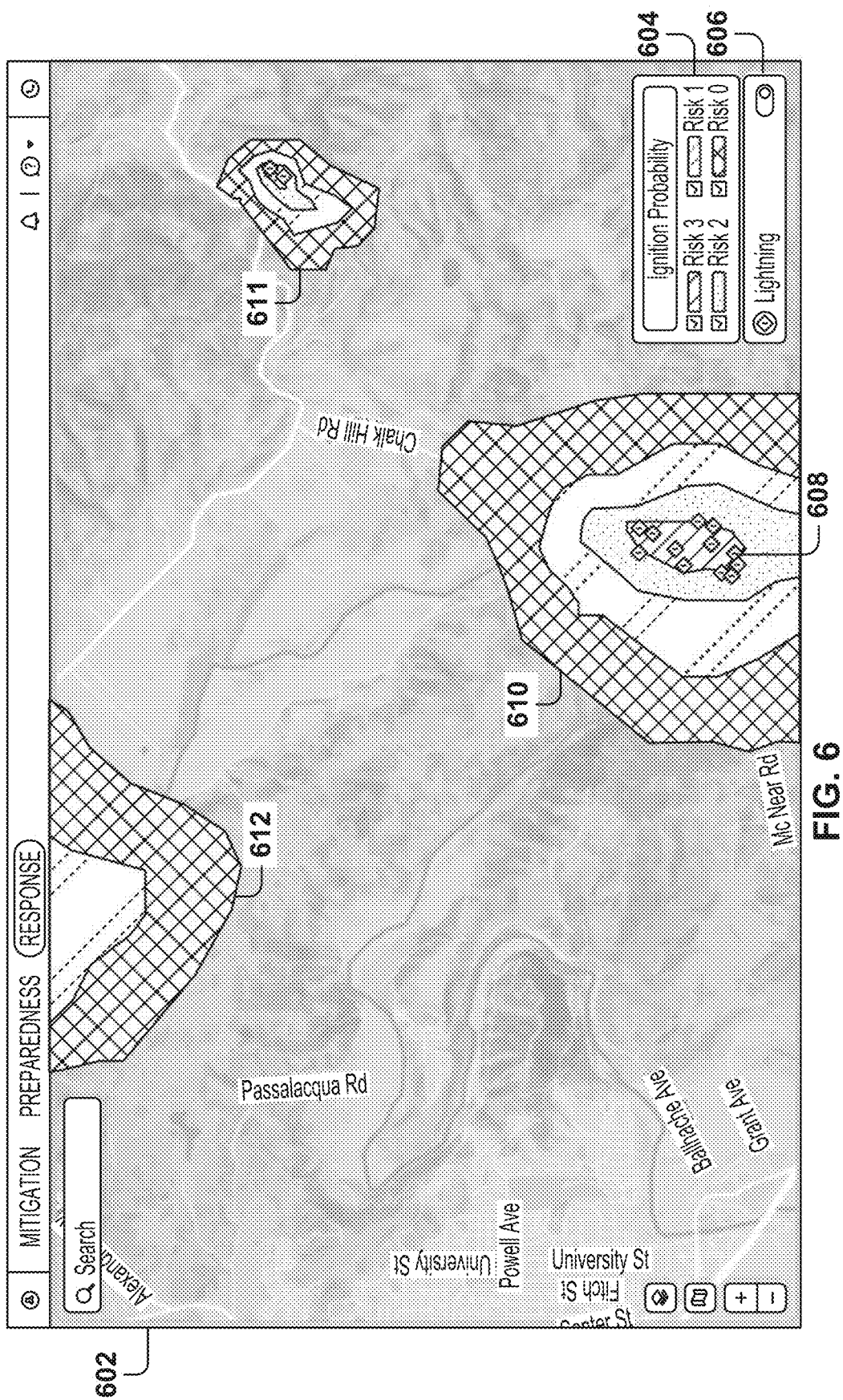
FIG. 6 is a user interface, of the computer system, for monitoring wildfires based on current conditions, according to some example embodiments.

FIG. 6 is a user interface 602, of the computer system, for monitoring wildfires based on current conditions, according to some example embodiments. User interface 602 shows the likelihood of wildfires starting based on the present situation. Diamond icons 608 show the probability of lighting happening during the storm, which may cause new fires.

Colored areas 610-612 show where fire may ignite. Legend 604 shows the color legend for the risk of fire (e.g., numbered from 0 to 3, with 3 being for the highest risk). Box 606 includes an option for selecting whether to show the icons 608 representing the probability of lightning.

In another example embodiment, another box (not shown) may be provided to select whether to show fire-ignition risk due to power lines starting a fire. For example, in the presence of high winds, the power lines may cause sparks that may result in fire ignitions.

In the example illustrated in FIG. 6, the highest risk area is the area with a higher probability of lightning strikes. Further, three different risk areas are identified in this region. Thus, as illustrated in FIG. 6, fire monitoring is not just about monitoring a current fire, but also about monitoring conditions to estimate the risk of a fire starting.

Figure 7:
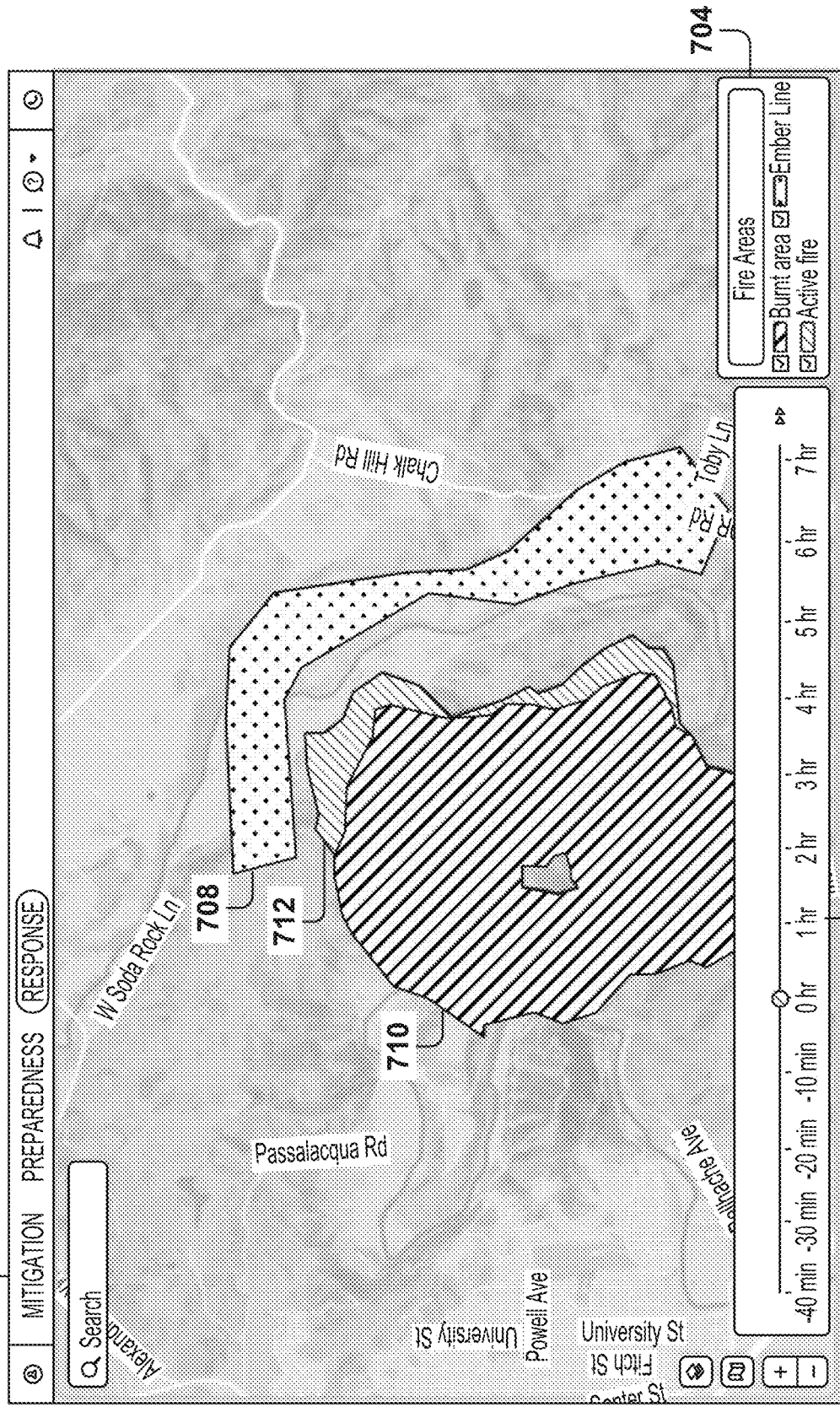
FIG. 7 is a user interface, of the computer system, for viewing the evolution of wildfires, according to some example embodiments.

FIG. 7 is a user interface 702, of the computer system, for viewing the evolution of wildfires, according to some example embodiments. The user interface 702 illustrates the evolution of the live fire, that is, the user interface 702 provides a representation of the fire forecast. The map shows the burnt scar 710 (area that has already burnt), the active fire 712 (area where the fire is live), and the ember area 708 (area where ember may fall and ignite new fires). Legend box 704 illustrates the different types of fire areas.

A time bar 706 is provided to select the time for the presentation of the fire map, which may be a time in the past to show how the fire has evolved, or a time in the future to show the fire forecast at different times. The time scale may be configured for different time steps, such as thirty minutes, an hour, two hours, twelve hours, etc.

By using the time bar 706, the user transitions seamlessly between the fire monitoring aspect and the fire prediction aspect, easily blending the past with the future of the fire.

In some previous fire prediction tools, a map is provided with a line indicating the active fire line and a line predicting where the fire may be later (e.g., in 24 hours). The prediction is done once a day (or in longer periods such as a week) and there are no live updates based on additional information. Also, these predictions fail to consider the weather and changes in the weather (such as prevailing wind direction).

The fire prediction tool is not a statics tool because it takes updates on fire-related data to continuously improve fire predictions. The fire prediction tool is continuously updating the forecast as additional data becomes available.

Figure 8:
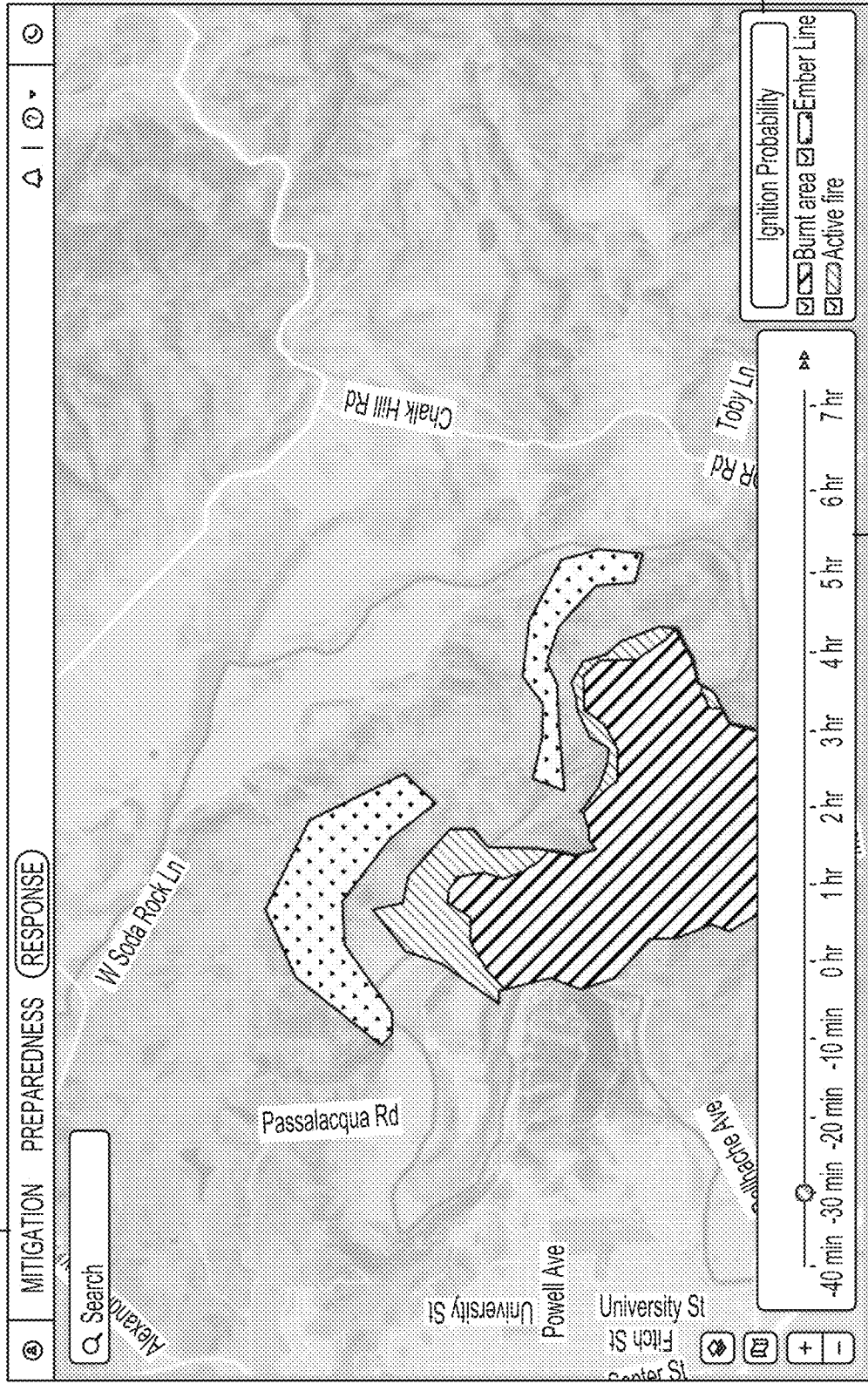
FIG. 8 is a user interface, of the computer system, for tracing historical behavior of an active fire, according to some example embodiments.

FIG. 8 is a user interface 802, of the computer system, for tracing historical behavior of an active fire, according to some example embodiments. In FIG. 8, the time bar 706 has been moved back to −30 minutes from the current time. When comparing with the illustration in FIG. 7, it can be seen that the size of the fire is smaller and that the map now shows where the fire originated.

Figure 9:
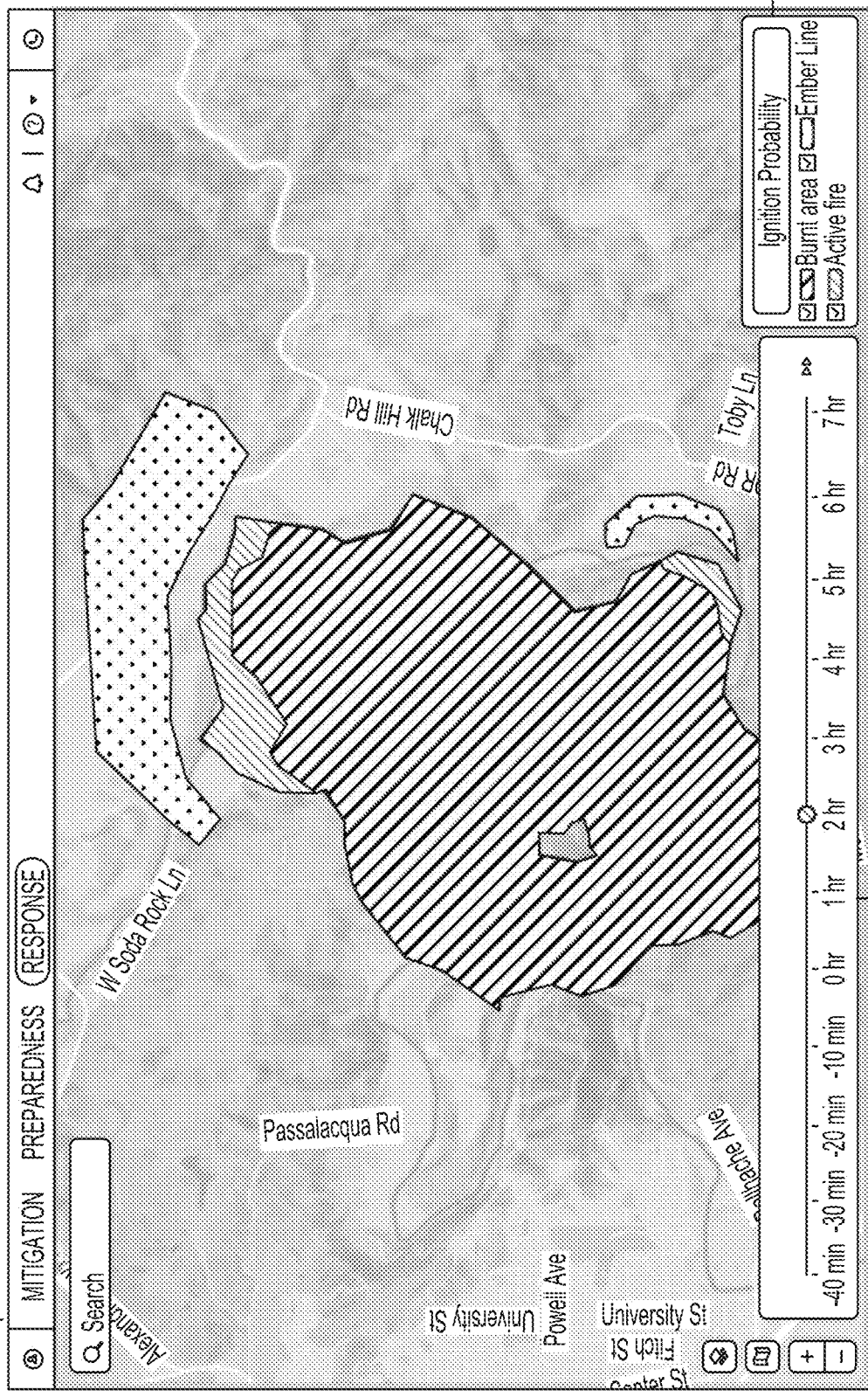
FIG. 9 is user interface, of the computer system, with a sliding timeline for time-stamp predictions of the active fire path, according to some example embodiments.

FIG. 9 is user interface 902, of the computer system, with a sliding timeline for time-stamp predictions of the active fire path, according to some example embodiments. In FIG. 9, the time marker in the time bar 706 has been moved two hours into the future from the current time. When comparing with the illustration in FIG. 7, it can be observed how the fire will grow and in which directions. In this example, there are now two active fire fronts, one to the north and one to the east, with respective ember lines where new fires may ignite due to ember spread.

Figure 10:
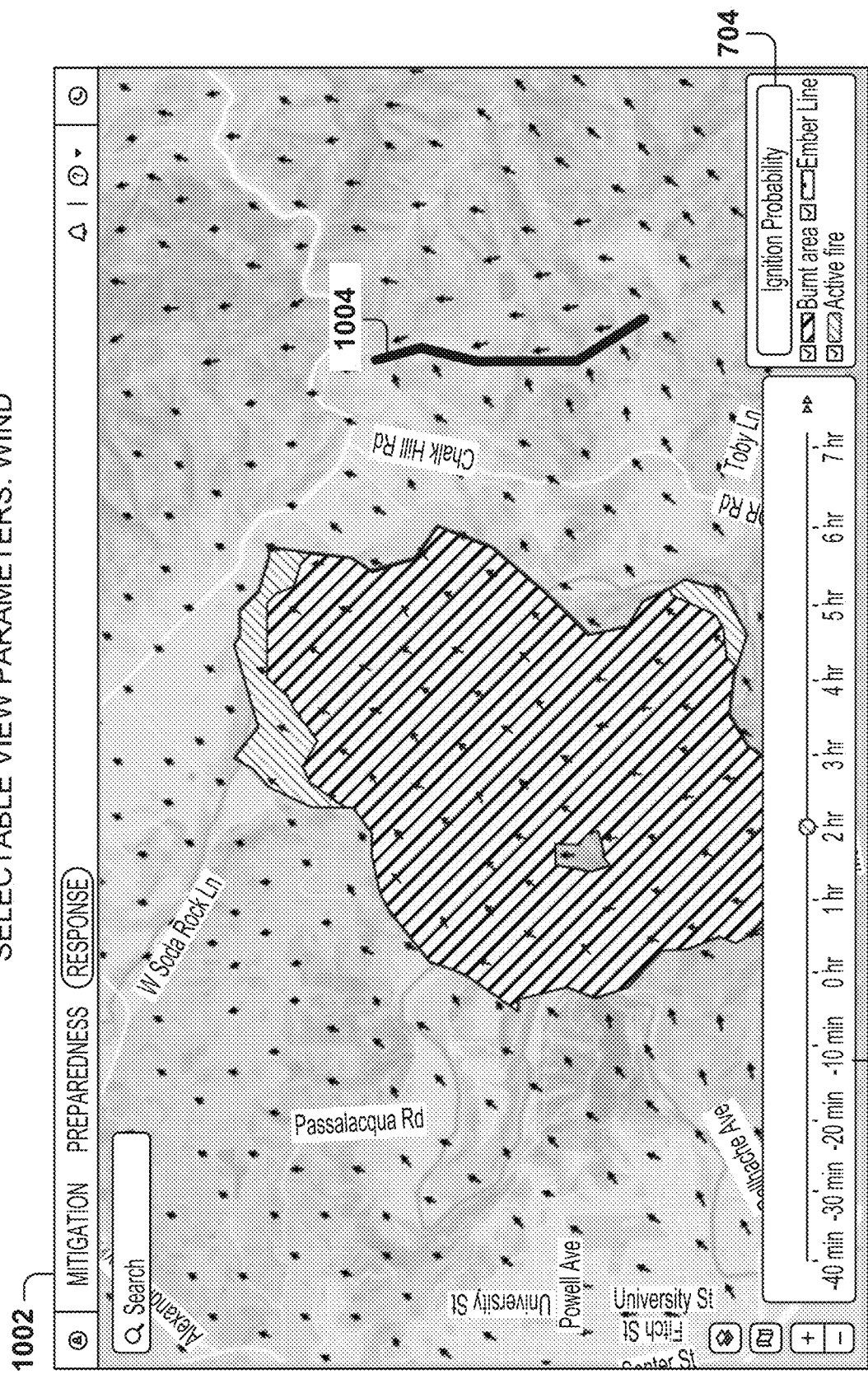
FIG. 10 is a user interface, of the computer system, with a selected view of wind parameters, according to some example embodiments.

FIG. 10 is a user interface 1002, of the computer system, with a selected view of wind parameters, according to some example embodiments. The fire monitor user interface includes options for presenting or omitting different types of information that affects fire. In some example embodiments, the fire monitor user interface includes selectable view parameters for wind (FIG. 10), instability (FIG. 11), fuel (FIG. 12), rain, temperature, fumes, etc.

The user interface 1002 shows wind information. A plurality of arrows in the map show the direction of the wind at the different locations. When a fire manager is trying to make decisions about the fire, wind direction is important to assessing the spread of the fire. If the wind direction is constant, then planning is easy. However, when conditions change, such as a wind-direction change, then danger increases because of the unexpected evolution of the fire that may catch by surprise residents and firefighters in the area. This is why it is important to monitor wind direction throughout the region.

Additionally, the fire itself may create changes in the local winds, creating instability that may change fire behavior very drastically in a short amount of time. Firefighters may lose their lives because of these quick changes in the fire spread.

In the example embodiment illustrated in FIG. 10, the fire monitor has detected a special area where wind direction from one area meets a different wind direction from another area. Boundary line 1004 shows a special boundary where the two wind directions meet: winds on an eastern direction meet winds on a northern direction. This is important for the firefighters because if the fire reaches this boundary line 1004, then the fire spread will change direction and possibly create difficulties for firefighters and residents in the area.

It is noted that if the time is moved forward on the time bar 706, then it is possible to see how the fire spread will change when the fire meets the boundary line 1004. The fire manager may decide not to send firefighters to this problematic area to avoid danger.

Figure 11:
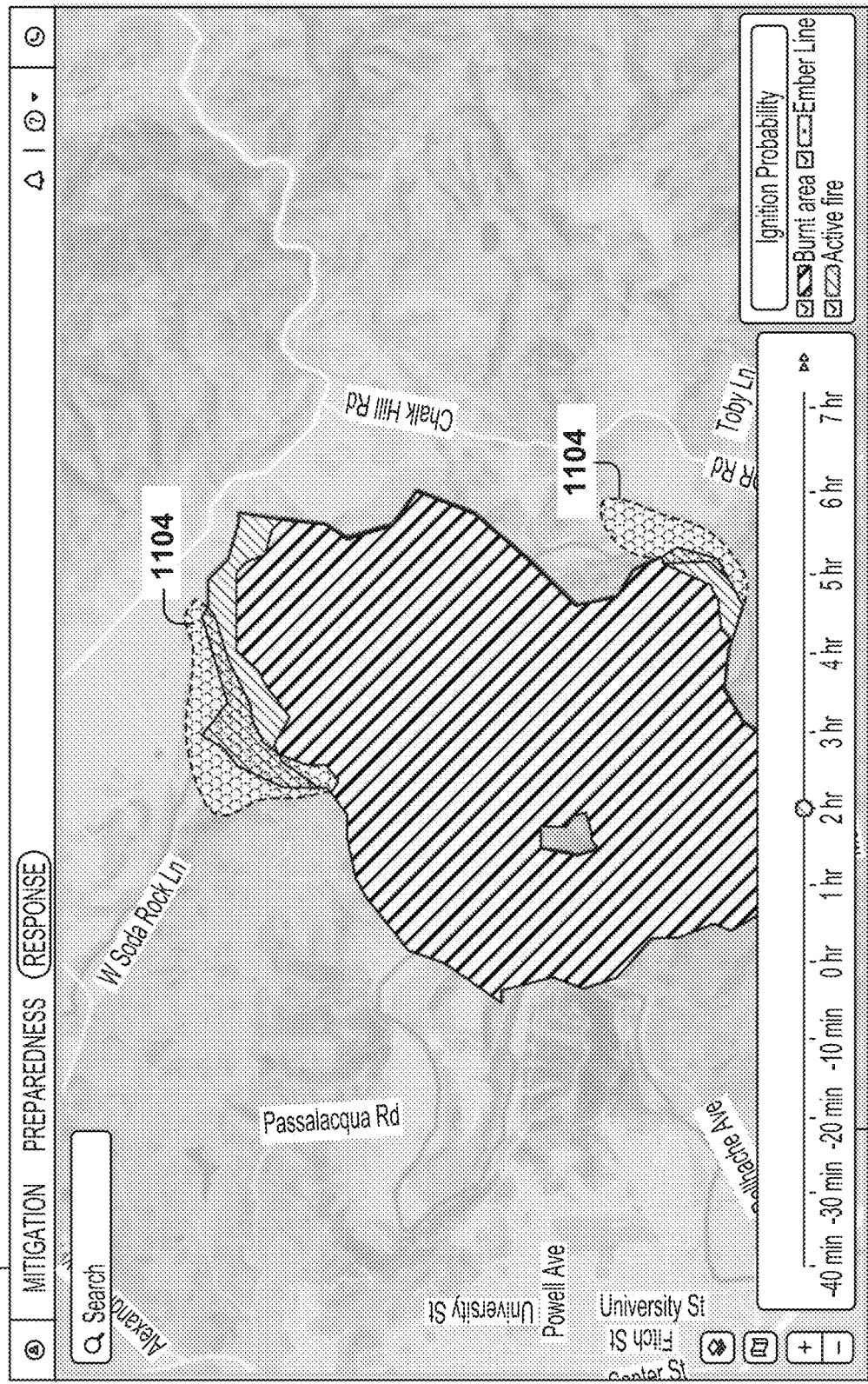
FIG. 11 is a user interface, of the computer system, with a selected view of instability parameters, according to some example embodiments.

FIG. 11 is a user interface 1102, of the computer system, with a selected view of instability parameters, according to some example embodiments. As the fire interacts with the weather and the environment, areas of instability 1104 may be created where the fire may exhibit volatile behavior. The fire forecast identifies these areas of instability 1104 to assist the fire manager to avoid problematic areas that may cause injury due to a sudden change in the evolution of the fire footprint or the speed of propagation.

To determine the areas of instability 1104, the fire forecast analyzes multiple factors, such as weather (e.g., wind), topography, fuel for the fire, etc., to determine when these conditions might signal a change in the fire pattern or an acceleration of the fire spread.

In some example embodiments, the area of instability 1104 is determined based on a change in the fire spread beyond a certain threshold (e.g., rate of spread (ROS) increases by twenty percent or more) or when the direction of the fire spread changes (e.g., prevailing direction of the fire changes more than 30 degrees).

Figure 12:
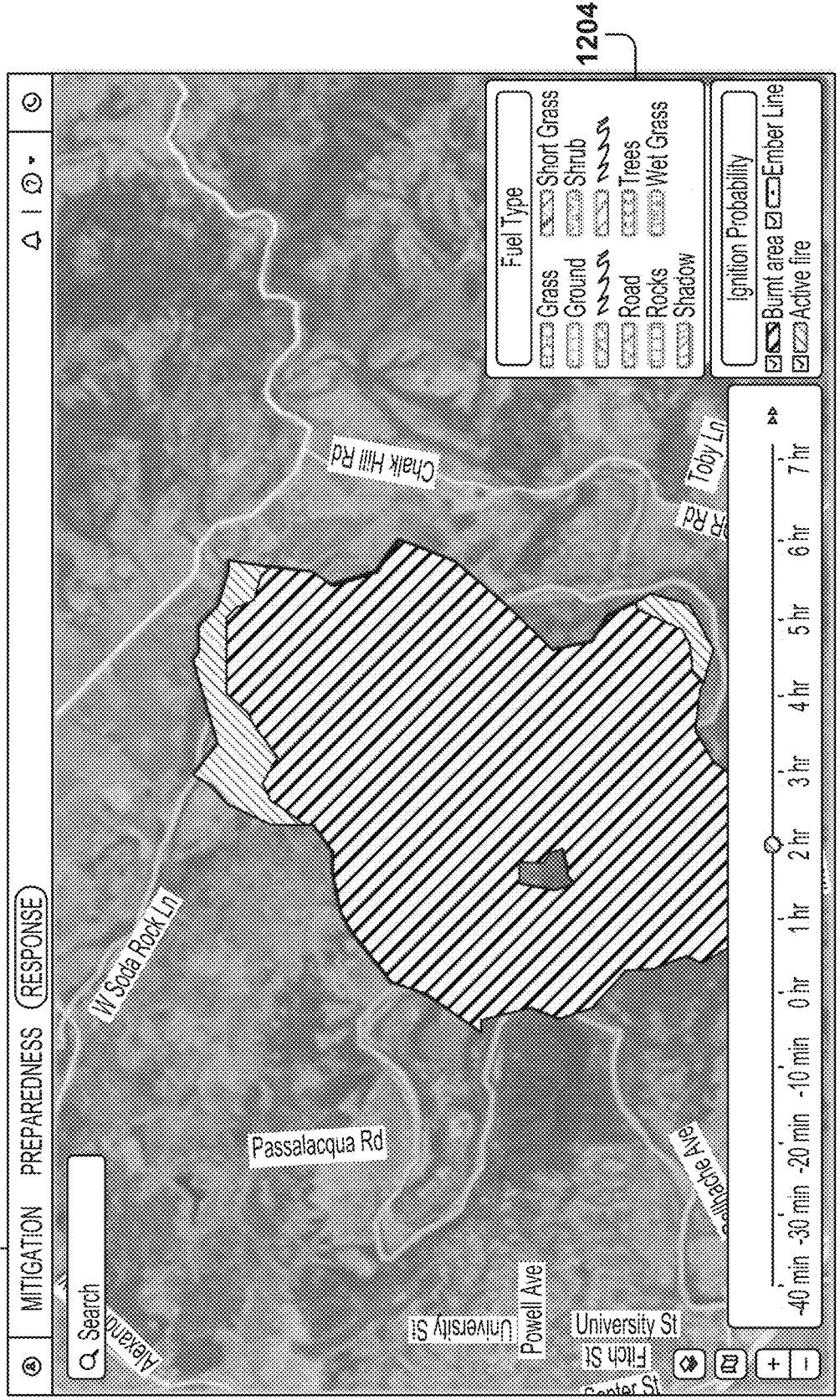
FIG. 12 is user interface, of the computer system, for viewing fuel parameters, according to some example embodiments.

FIG. 12 is user interface 1202, of the computer system, for viewing fuel parameters, according to some example embodiments. The user interface 1202 provides a color-coded representation of the fuel materials in the region. Legend box 1204 describes the different types of material, which may include one or more of grass, ground, retem, road, rocks, shadow, short grass, shrub, thymus, trees, wet grass, etc.

By identifying the type of fire fuel in the direction of the fire spread, it is easy to understand the fire evolution and to plan for the transport of people and equipment in the area.

Figure 13:
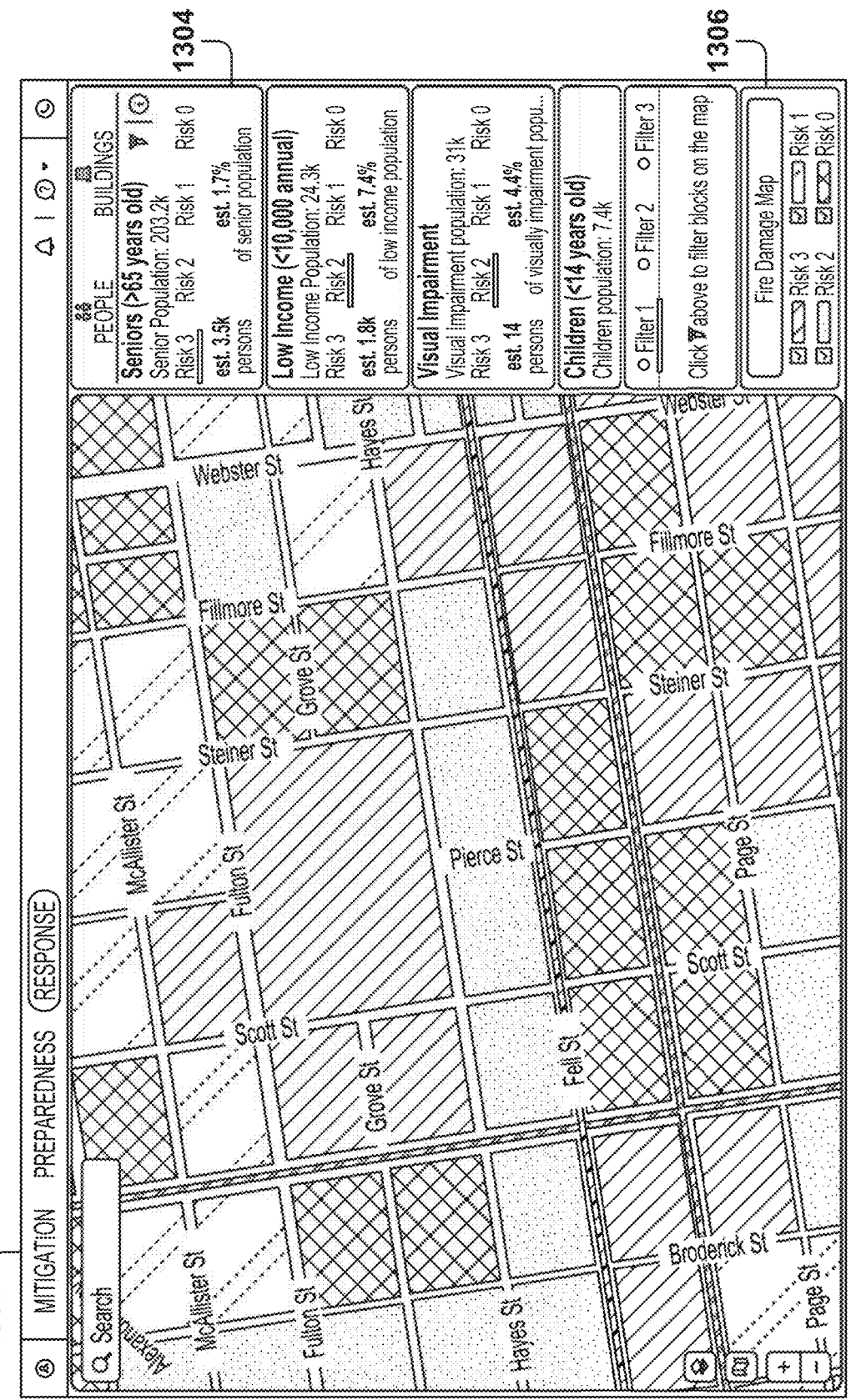
FIG. 13 is a user interface, of the computer system, showing block-level risk of an urban area, according to some example embodiments.

FIG. 13 is a user interface 1302, of the computer system, showing block-level risk of an urban area, according to some example embodiments. The user interface 1302 shows a map encompassing several city blocks and a window 1304 with demographic information about the people in the selected area covered by the map.

Each of the blocks in the city are assigned a risk level from 0 to 3, with 3 being the highest risk level. The risk level is color-coded for the block, as described in the legend box 1306.

The window 1304 with demographic information includes information about seniors in the area, number of families with low income, number of people with visual impairment, and number of children. For the senior group, the window 1304 shows the risk level, the estimated number of seniors, and the estimated percentage of the population that are seniors. Similarly, low-income families show the risk level, the number of persons with low income, and the percentage of the population. The same information is also provided for visual impairment and children.

The risk level represents the probability of loss because of fire. A risk level of 0 represents no damage or very little damage, a risk level of 1 represents some damage, a risk level of 2 represents substantial damage, and a risk level of 3 represents total loss.

The window 1304 with demographic information assists the community leaders in planning help for people at a higher risk. By knowing where the most sensitive population is located, the community leaders may prioritize the often-scarce resources to assist these people first.

Also, by using the timeline bar (not shown in FIG. 13), the user may determine the time frames when the people in the different blocks may need assistance.

Figure 14:
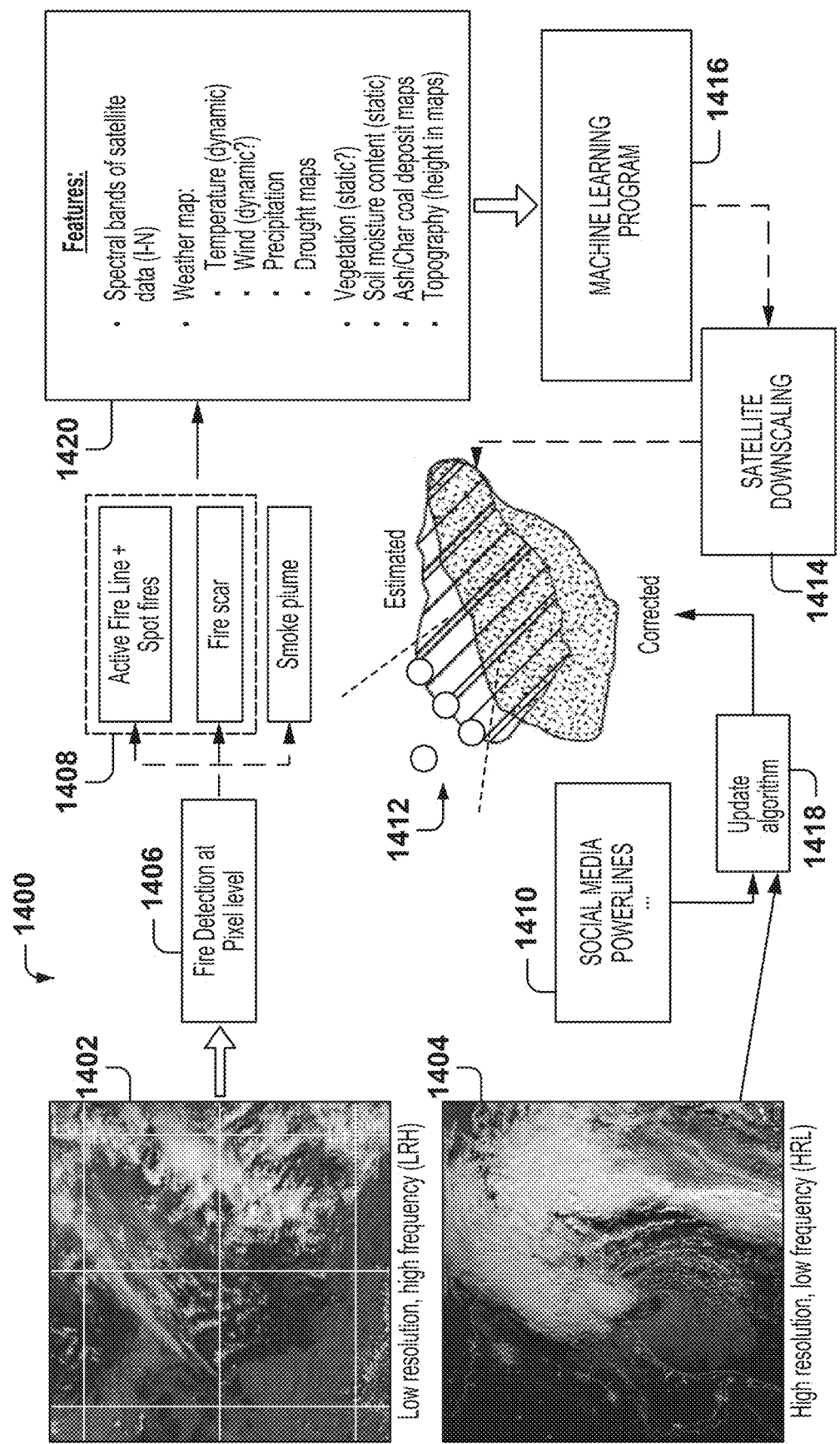
FIG. 14 illustrates hardware architecture for continuously updating the fire footprint, according to some example embodiments.

FIG. 14 illustrates hardware architecture 1400 for continuously updating the fire footprint, according to some example embodiments. The architecture 1400 provides the detail for the satellite-downscaling machine-learning model. As discussed above, there are two types of satellite images: low-resolution high-frequency (LRH) satellites, and high-resolution low-frequency (HRL) satellites.

One example of LRH is the GOES-R satellite. Some examples of the HRL satellites include MODIS, VIIRS, LANDSAT, Sentinel 1, and Sentinel 2. The National Oceanic and Atmospheric Administration (NOAA) operates a constellation of Geostationary Operational Environmental Satellites (GOES) to provide continuous weather imagery and monitoring of meteorological and space environment data for the protection of life and property across the United States. The GOES satellites provide critical atmospheric, oceanic, climatic, and space weather products supporting weather forecasting and warnings, climatological analysis and prediction, ecosystems management, safe and efficient public and private transportation, and other national priorities.

The Advanced Baseline Imager (ABI) is the primary instrument on the GOES-R Series for imaging Earth's weather, oceans, and environment. ABI views the Earth with 16 different spectral bands (compared to five on the previous generation of GOES), including two visible channels, four near-infrared channels, and ten infrared channels.

MODIS (or Moderate Resolution Imaging Spectroradiometer) is a key instrument aboard the Terra (originally known as EOS AM-1) and Aqua (originally known as EOS PM-1) satellites. Terra's orbit around the Earth is timed so that it passes from north to south across the equator in the morning, while Aqua passes south to north over the equator in the afternoon.

The MODIS instrument provides high radiometric sensitivity (12 bit) in 36 spectral bands ranging in wavelength from 0.4 µm to 14.4 µm. The responses are custom tailored to the individual needs of the user community and provide exceptionally low out-of-band response. Two bands are imaged at a nominal resolution of 250 m at nadir, with five bands at 500 m, and the remaining 29 bands at 1 km. A ±55-degree scanning pattern at the EOS orbit of 705 km achieves a 2,330-km swath and provides global coverage every one to two days. MODIS land surface products are made available via the LANCE/EODIS portal.

The Visible Infrared Imaging Radiometer Suite (VIIRS) 375 m active fire product provides data from the VIIRS sensor aboard the joint NASA/NOAA Suomi National Polar-orbiting Partnership (Suomi-NPP) satellite. The 375 m data means that each pixel in the image from the satellite covers a square with a side of 375 m. The 375 m data complements Moderate Resolution Imaging Spectroradiometer (MODIS) fire detection; they both show good agreement in hotspot detection but the improved spatial resolution of the 375 m data provides a greater response to fires of relatively small areas and provides improved mapping of large fire perimeters. The 375 m data also has improved nighttime performance. Consequently, these data are well suited for use in support of fire management (e.g., near real-time alert systems), as well as other science applications requiring improved fire mapping fidelity.

The Landsat program is the longest-running enterprise for acquisition of satellite imagery of Earth. On Jul. 23, 1972, the Earth Resources Technology Satellite was launched. This was eventually renamed to Landsat, and the most recent. Landsat 8, was launched on Feb. 11, 2013. The images from Landsat may be viewed through the U.S. Geological Survey (USGS) 'EarthExplorer' website. Landsat 7 data has eight spectral bands with spatial resolutions ranging from 15 to 60 meters; the temporal resolution is 16 days.

Sentinel-2 is an Earth observation mission developed by ESA as part of the Copernicus Program to perform terrestrial observations in support of services such as forest monitoring, land cover changes detection, and natural disaster management. It consists of two identical satellites. The Sentinel-2 mission provides multi-spectral data with 13 bands in the visible, near infrared, and short wave infrared part of the spectrum, and systematic global coverage of land surfaces from 56° S to 84° N, coastal waters, and all of the Mediterranean Sea.

In some example embodiments, the images from GOES-R and VIIRS are used for fire monitoring, but the information from any other satellite may also be utilized. By using VIIRS, the satellite image resolution is 375 m (e.g., each pixel coves a square 375×375) and is received every 16 to 18 hours, while the GOES-R resolution is about 2 Km but is available at intervals as low as five minutes. That is, the high-resolution images are not received very often and provide higher resolution, and the low-resolution images are received often but provide low resolution.

The LRH images are analyzed at operation 1406 to detect the presence of fire at each pixel. The LRH images from different bands are analyzed, as described in more detail below with reference to FIG. 15. Based on known patterns of the presence of fire, a determination is made to see if each pixel represents fire presence (e.g., 1) or if the pixel represents the absence of fire (e.g., 0). Therefore, this is a binary classification problem. In general, the presence of fire will mean that a pixel is brighter, at least, in several light bands, and the brightness may be used to determine if the pixel represents fire.

In another example embodiment, instead of a binary classification, the information for each pixel includes if the pixel is for an area on fire, and the intensity of the fire if applicable.

The results 1408 of the analysis at the pixel level include the determination of the active fire line and spot fires, the fire scar, and the smoke plume. The determination of the active fire line and the spot fires is made by determining the boundaries of areas with fire pixels. The smoke plume is also determined from the satellite images, based on the known conditions that result in smoke plume. For example, previous images with smoke plume are compared to images without smoke plume to determine the parameters for determining the presence of smoke plume.

The results 1408 are used as input for a machine-learning program 1416 that uses a plurality of features 1420 to perform the satellite downscaling 1414 and obtain the fire map 1412. More details about the machine-learning program 1416 and the features 1420 are provided below with reference to FIG. 17. Some of the features 1420 include the spectral bands of satellite data, weather information—including temperature, wind, precipitation, and drought maps—vegetation, soil moisture content, ash and charcoal deposit maps, topography, etc.

In some example embodiments, the satellite downscaling 1414 generates fire data for pixels with a size of 30 m (referred to herein as hi-res pixels), but other pixel sizes may be implemented, such as in the range from 1 m to 150 m. Thus, the satellite resolution of 2 Km is downscaled to 30 m. This means that each image pixel covers about 4444 hi-res pixels.

In some example embodiments, for each hi-res pixel, the machine-learning program 1416 predicts if the corresponding area is on fire or not; that is, it is a binary classification problem. Further, the machine-learning program 1416 may also generate additional information, such as areas of instability or ember lines. For example, for each hi-res pixel, the machine-learning program 1416 provides a probability that the pixel contains embers that may ignite a fire.

The machine-learning program 1416 is trained with data from past fires. The feature data is collected for previous fire events (e.g., satellite images, weather data, vegetation, etc.) at different times and this data is used for the training. Further, in some example embodiments, Gaussian smoothing is applied to the hi-res pixels so that transitions are smoother to avoid or reduce random fire pixels.

Once the hi-res pixels are identified, the fire perimeter is determined, as well as other details of the map, such as the fire scar, the fire risk, and the evolution of the fire. Additionally, the machine-learning program 1416 may be executed for different points in time in order to generate the fire forecasts for different time periods.

An update algorithm 1418 may obtain additional data and make corrections to the fire map 1412. The update algorithm 1418 may utilize LRH and HRL images, information from social media and power lines, updates from firefighters on the field, etc., to make map corrections. That is, the update algorithm 1418 provides live updates to update the fire maps as new information is received. Instead of having to wait 24 hours for a new prediction, the live updates may update the fire maps every 30 minutes, although other frequencies maybe used. In addition, the fire updates may be performed on demand from the user as new information is made available.

In some example embodiments, the update algorithm 1418 is also a machine-learning program that calculates the updated hi-res pixels. Additionally, more direct methods may be used. For example, if a photograph of an area with fire information is received, the hi-res pixels may be updated directly based on the photograph information.

Figure 15:
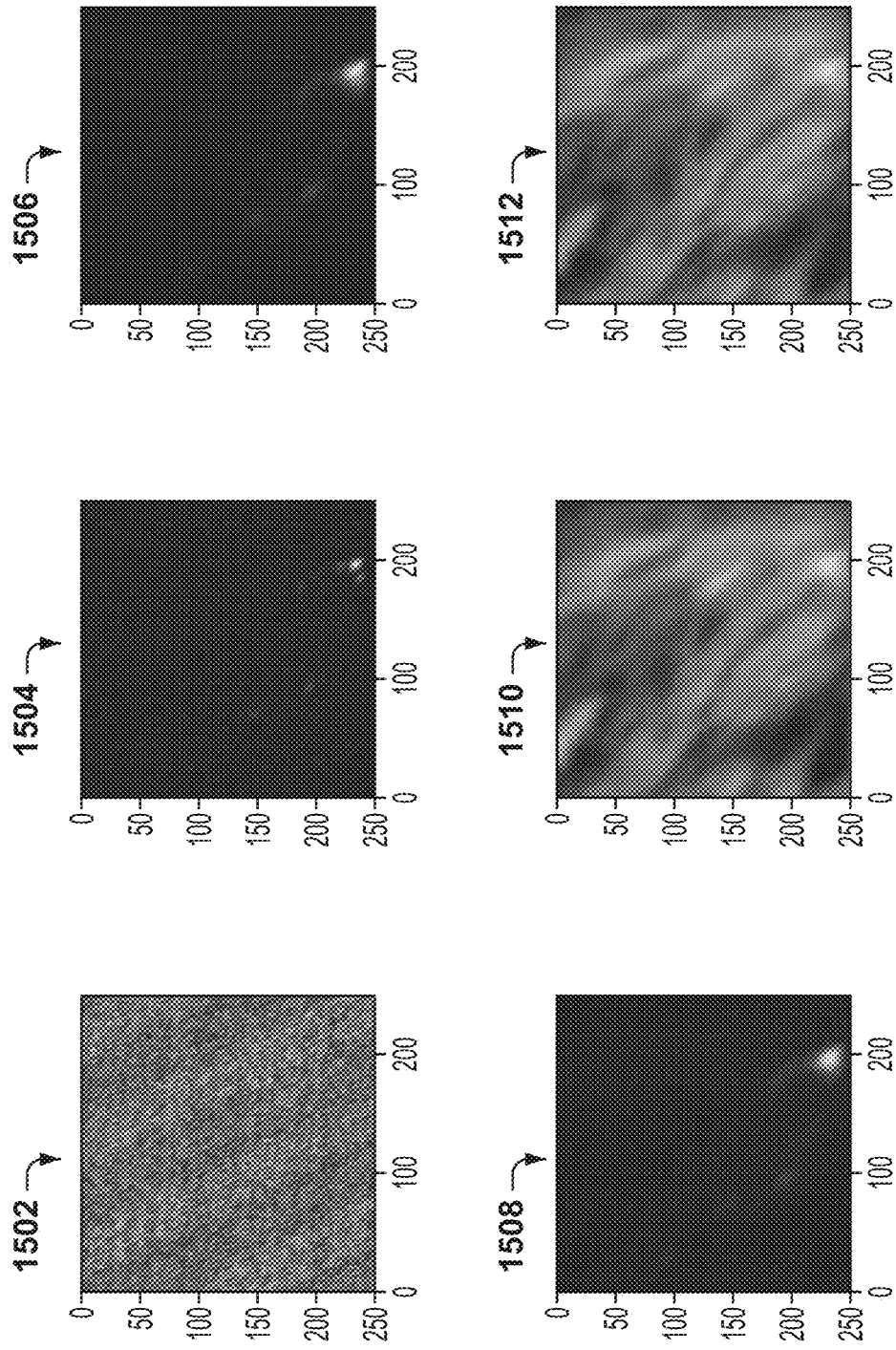
FIG. 15 illustrates satellite images of the fire obtained in different frequency bands, according to some example embodiments.

FIG. 15 illustrates satellite images of the fire obtained in different frequency bands, according to some example embodiments. FIG. 15 is a black-and-white representation of the images from the different bands for GOES-R Satellite Channels.

The satellite has 16 channels, also referred to as bands, that cover different light wavelengths, and channels 2, 5, 6, 7, 14, and 15 are known to be sensitive to fire or smoke. In addition to being sensitive to fire, these channels may also provide information regarding vegetation, type of terrain, the canopy (e.g., how high trees are, how dense a forest is), weather, etc.

FIG. 15 shows some samples of images captured in the different bands for an active fire: image 1502 for channel 2, image 1504 for channel 5, image 1506 for channel 6, image 1508 for channel 7, image 1510 for channel 14, and image 1512 for channel 15.

Figure 16:
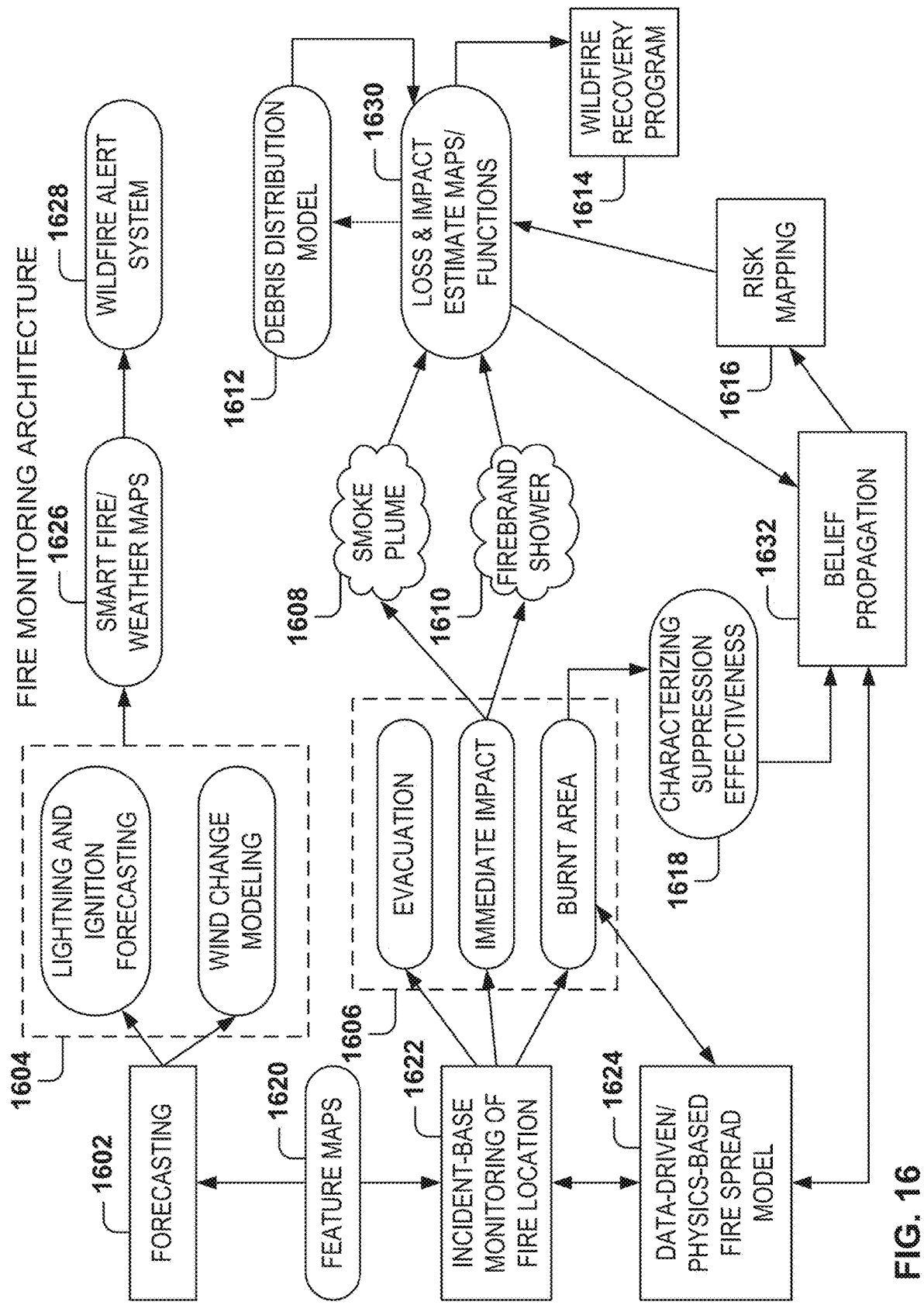
FIG. 16 illustrates hardware architecture for monitoring a fire, according to some example embodiments.

FIG. 16 illustrates hardware architecture for monitoring a fire, according to some example embodiments. The fire forecasting 1602 predicts the evolution of the fire within the region. The fire forecasting 1602 may generate 1604 lightning and ignition forecasting and wind-change modeling. The lightning and ignition forecasting provides probabilities of lightning and new fires in an area, as illustrated before with reference to FIGS. 6 and 7. The wind-change modeling analyzes the wind conditions within the region and identifies possible changes based on weather forecasting and other conditions. Additionally, the wind-change modeling may identify areas where winds in different directions meet, which may result in changes in the fire conditions, as illustrated above with reference to FIG. 10.

The fire forecasting 1602 may also generate fire and weather maps 1626 that indicate how the fire and the weather may evolve. Further, as a result of the predictions, a wildfire alert system 1628 may generate fire alerts, which may be sent to community managers or to residents in the affected areas.

To monitor fire locations and fire-related incidents 1622, the feature maps 1620 and a data-driven, physics-based, fire spread model 1624 is used, such as the model described below with reference to FIG. 18. The monitoring of fire-related incidents 1622 generates outputs 1606, which include evacuation plans, immediate impact on community resources, and identification of the burnt area. The outputs 1606 may also determine the smoke plume 1608 on the area and the firebrand shower 1610 that may cause new fires. The burned area data may also be used to characterize the effectiveness of fire suppression efforts 1618. Modeling may be performed to determine the impact of fire-mitigation efforts in the spread of the fire and the damage to people and property. The fire-mitigation efforts may include assigning firefighting crews to certain locations, dropping water in certain locations, burning certain areas ahead of the fire, etc.

The fire spread model 1624 may be data driven (e.g., machine-learning model) or a physics-based spread model, or a combination thereof. More details are provided below with reference to FIGS. 17-21.

Estimates of loss (e.g., damage) and the impact of the community (referred to as loss estimates 1630) are created based on the smoke plume 1608, the firebrand shower 1610, the debris distribution model 1612, and a risk mapping model 1616. For example, the loss estimates 1630 may include the burn scar and buildings damaged by the fire. The risk mapping model 1616 identifies the risks associated with fire, such as the risk of fire starting and the risk of loss. See, for example, the map of the damage by city block shown in FIG. 13.

A belief propagation model 1632 predicts the evolution of the fire in the area, and the results may be used by the risk mapping model 1616. Additionally, the loss estimates 1630 may be utilized for a wildfire recovery program 1614 to recover forest areas after large wildfires.

Figure 17:
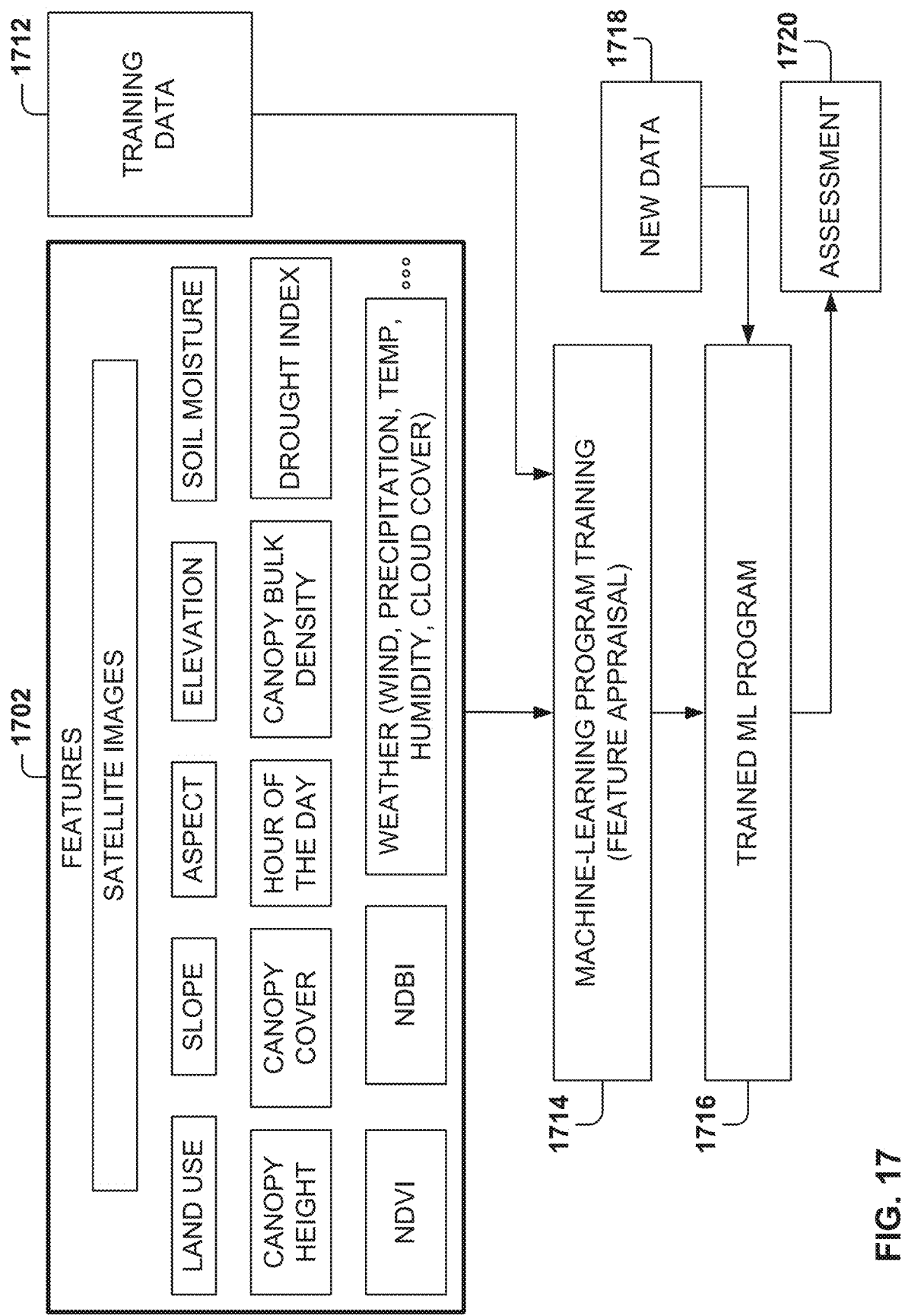
FIG. 17 illustrates the training and use of a machine-learning program, of the computer system, according to some example embodiments.

FIG. 17 illustrates the training and use of a machine-learning program, of the computer system, according to some example embodiments. In some example embodiments, machine-learning programs (MLPs), also referred to as machine-learning algorithms or tools, are utilized to perform operations associated with fire monitoring and forecasting.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1712 in order to make data-driven predictions or decisions expressed as outputs or assessments 1720. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classification or regression.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

In some embodiments, example machine-learning algorithms provide a classification of a hi-res pixel in a map, determining if the pixel corresponds to an area on fire or not. In other example embodiments, the machine-learning program determines a probability that a hi-res pixel is on fire. If the probability is greater than or equal a predetermined threshold, then the pixel is considered to be on fire; otherwise, the pixel is not on fire. In some example embodiments, the threshold is a probability of 50% of fire, but other thresholds may be utilized (e.g., 60% 75%, 90%, etc.). In other example embodiments, the machine-learning program determines if a high-res pixel is on fire at a certain time in the future (e.g., the area corresponding to the pixel will be on fire in two hours).

The machine-learning algorithms utilize the training data 1712 to find correlations among identified features 1702 that affect the outcome. The training data 1712 includes data from previous large fires.

The machine-learning algorithms utilize features 1702 for analyzing the data to generate assessments 1720. A feature 1702 is an individual, measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

The fire features 1702 may be classified as static features, which do not change (or do not change very much) over time, and dynamic features that may change in a short amount of time. The static features may include one or more of land use, slope, aspect, elevation, soil moisture, canopy height, canopy cover, canopy bulk density, hour of the day, drought index. Normalized Difference Vegetation Index (NDVI), and Normalized Difference Built-up Index (NDBI).

The dynamic features include the satellite-image information and weather-related features, such as wind, precipitation, temperature, humidity, cloud coverage, etc. The dynamic features may also include information obtained from satellites. Different embodiments may use all or a subset of these features or add additional fire-related features.

Land use refers to the characteristics of the land, e.g., the land is grassland, is covered with pine trees, is an urban area, is a desert, etc. Slope defines the inclination in the terrain, which is a factor for the spread of fire because fire moves faster when spreading uphill.

Aspect indicates the direction that the slope is facing, e.g., facing north. Elevation indicates the altitude of the hi-res pixel. Soil moisture indicates the amount of water on the soil.

Canopy height indicates the height of the trees in the hi-res pixel area, such as, for example, the average height of trees in the hi-res pixel area. Canopy cover is the percentage of sunlight that does not hit the ground because of the blocking by the canopy. For example, an 80% canopy cover provides a large amount of cover because only 20% of sunlight hits the ground; a 10% canopy cover means that most of the sunlight hits the ground.

Canopy bulk density indicates the density of the canopy in the area, which is similar to canopy cover, but the canopy bulk measures volumetrically. The time (or hour) of the day is important as the time may affect the values of the satellite channels. Some channels appear more distinctly than others at day or night. In order for the model to learn this distinction, the MLP includes hour of the day as a feature.

The drought index is a measurement of dryness based on recent precipitation and temperature. The NDVI is a simple graphical indicator used to analyze remote sensing measurements and assess whether the target being observed contains live green vegetation or not. The NDBI index highlights urban areas where there is typically a higher reflectance in the shortwave-infrared (SWIR) region, compared to the near-infrared (NIR) region.

The weather features include wind, precipitation, temperature, humidity, cloud cover, etc. Cloud cover may be important at times because the satellite image information may be greatly reduced in the presence of heavy cloud cover. Therefore, considering the effect of cloud cover on input images improves the quality of the predictions.

The machine-learning algorithms utilize the training data 1712 to find correlations among the identified features 1702 that affect the outcome or assessment 1720. In some example embodiments, the training data 1712 includes labeled data, which is known data for one or more identified features 1702 and one or more outcomes.

With the training data 1712 and the identified features 1702, the machine-learning tool is trained at operation 1714. The machine-learning tool appraises the value of the features 1702 as they correlate to the training data 1712. The result of the training is the trained machine-learning program 1716.

When the machine-learning program 1716 is used to perform an assessment, new data 1718 is provided as an input to the trained machine-learning program 1716, and the machine-learning program 1716 generates the assessment 1720 as output. For example, the machine-learning program 1716 may determine if a hi-res pixel is on fire or not, or another machine-learning program may determine if the high-res pixel will be on fire at a predetermined time in the future (e.g., four hours from the current time).

Some testing was performed for the machine-learning program by training the machine-learning program with data from several actual fires. The performance was then tested with data from a different known fire that was not included in the training data 1712. The results of the machine-learning program estimates where compared to the actual fire (e.g., fire forecasting two hours in the future, fire monitoring for the current presence of fire), and the results showed good accuracy levels (e.g., using a confusion matrix and F-1 scores). Early testing results varied based on the training and testing data used, showing accuracy levels between about 70% and 92%, although these results are not meant to be exclusive or limiting, but rather illustrative, and will continue to improve as additional fire data is added.

Additionally, high-resolution satellite images of the actual fire were compared to fire monitoring maps based on the low-resolution satellite images, and the fire map estimates were very approximate to the actual fire maps. In other tests, the areas with fire were accurately predicted with a slight increase in the actual size of the fire. It is expected that as more fire data is available and the machine-learning models are fine-tuned, their accuracy will continue improving.

It was also noted during testing that the size of fires may vary considerably, with some fires being small while other fires are very large. The behaviors of small and large fires may vary due to their size, so using fire data for the right fire size also improves accuracy. In some embodiments, the size of the fire may also be used as a feature for the machine-learning programs.

Some regression models only consider each pixel separately. On the other hand, some deep-learning models are able to correlate hi-res pixels with their surrounding hi-res pixels and the results tend to show smoother transitions, but with a cost of higher complexity.

In order to update the model predictions, new satellite information is obtained, as well as values for some of the features described above. Downloading the satellite image information may be a lengthy process, but once the satellite image information is available, retraining the model may be performed in about 30 minutes or less, although with more computer resources, the training time may be greatly reduced.

Therefore, updates to the fire for monitoring fire forecasting may be performed quickly without having to wait 24 hours or more to get new forecasts based on new available information.

It is noted that the embodiments illustrated in FIG. 17 are examples and do not describe every possible embodiment. Other embodiments may utilize different features, different testing data, etc. The embodiments illustrated in FIG. 17 should therefore not be interpreted to be exclusive or limiting, but rather illustrative.

Figure 18:
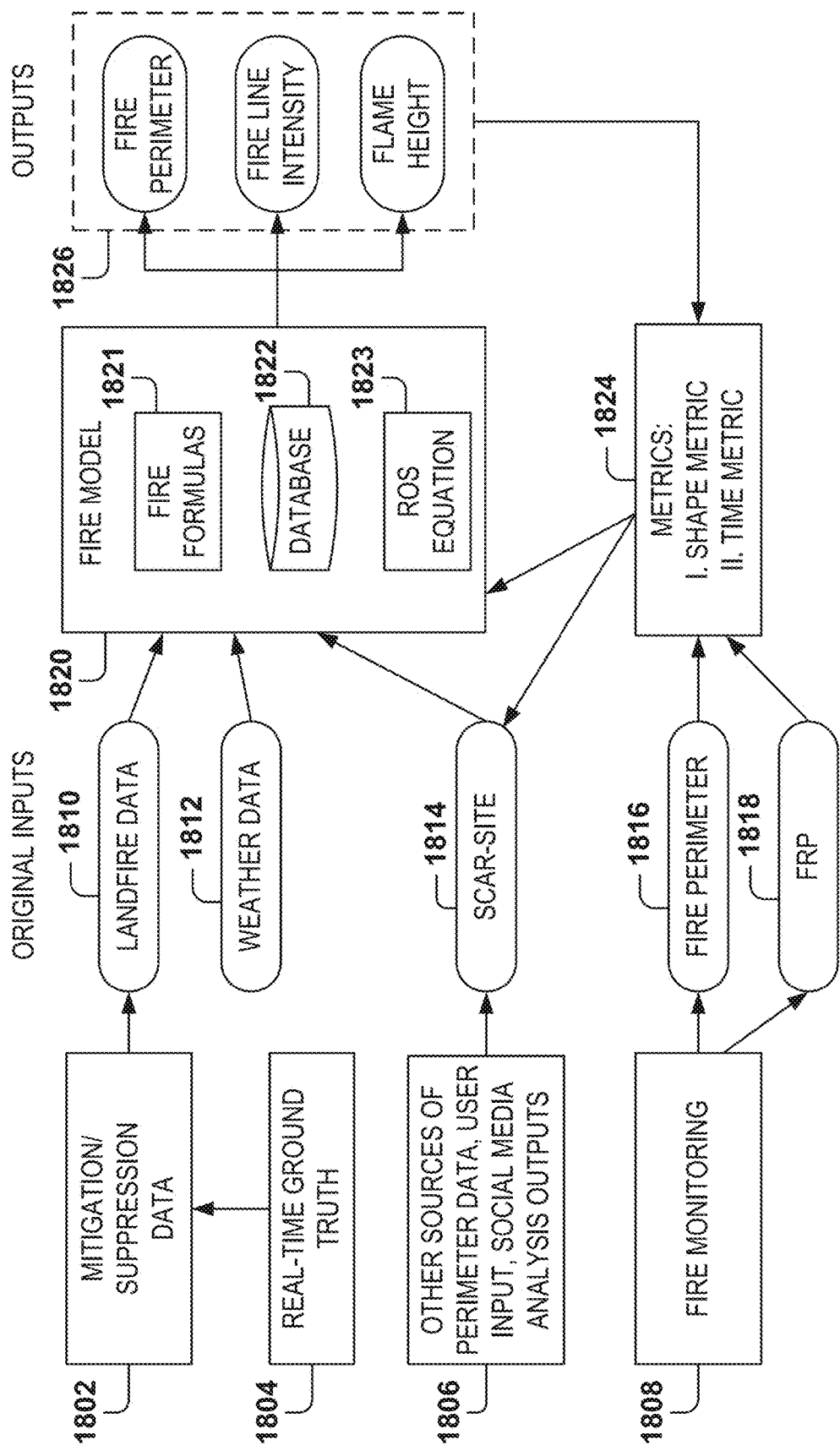
FIG. 18 is a diagram illustrating hardware architecture for forecasting a fire, according to some example embodiments.

FIG. 18 is a diagram illustrating hardware architecture for forecasting a fire, according to some example embodiments. The fire-forecasting architecture is multidisciplinary, combining remote-sensing, machine learning, and physics-based modeling of the fire-spread predictive platform.

Fire forecasting is a high-resolution, near-live forecasting tool designed to equip emergency-response managers and fire departments with information about the estimated evolution of the fire. In some example embodiments, fire forecasting combines physical modeling of wildfire spread with fire machine-learning situational awareness capability to provide reliable forecasts.

One objective of fire modeling is to model fire behavior in hopes of producing answers to the following questions: "How quickly and in which direction does the fire spread?", "How much heat does the fire generate?", "How high is the flame?", and so forth. Fire modeling also estimates the effects of fire, such as ecological and hydrological changes, fuel consumption, tree mortality, and amount and rate of generated emissions from the smoke plume.

Previous solutions for fire forecasting include physics-based models and operational fire models. One example of the physical model is the WRF-Fire model, which aims to capture the entire known physics in addition to the interactions between the fire and the atmosphere. The operational fire models, also known as rasterized fire spread models, are not designed to model the interactions between fire and atmosphere, which enables them to be much faster than full-scale models. Given the computational inefficiency and instability issues with full-scale models, the fire-spread modeling is optionally used as a component of the fire forecasting.

However, abilities of these models are limited for several reasons: the static accuracy based on semi-empirical equation of the ROS—also known as the Rothermel ROS equation 1823, their inability to identify extreme fire behavior, and being insensitive to the mitigation efforts as the operational models work based on pre-determined fuel maps. To overcome these limitations, present embodiments utilize a probabilistic data-driven approach to fire forecasting.

The inputs for the fire model 1820 include the Landfire data 1810, weather data 1812, and scar-site information 1814. The Landfire data 1810, provided by the wildland fire management programs of the U.S. Department of Agriculture Forest Service and U.S. Department of the Interior, provides landscape-scale geo-spatial products to support cross-boundary planning, management, and operations. Additionally, mitigation or suppression data 1802 may be applied on the fuel models of the Landfire data 1810 as well as the real-time ground truth 1804. Although some embodiments are presented herein regarding the use of Landfire data, other sources of vegetation data, topography data, and fire-fuel data may be used instead, or in combination with the Landfire data.

The Landfire data 1810 includes information regarding vegetation and fire fuel by geography, as well as changes on the landscape caused by management activities and natural disturbance. The Landfire data 1810 is a compilation of data from multiple sources, including satellite images, fire-mapping programs (e.g., burned areas), and other sources. The vegetation information describes existing vegetation types, canopy cover, and vegetation height.

The Landfire fuel data describes the composition and characteristics of surface and canopy fuel, such as forest canopy bulk density, forest canopy base height, forest canopy height, forest canopy cover and fire behavior fuel models. The Landfire data 1810 also includes topographic data regarding the geographic in the region and includes aspect (azimuth of the slope surfaces across a landscape in degrees), elevation (land height above mean sea level), and slope (percent change of elevation over a specific area, in degrees).

In some example embodiments, the weather data 1812 is imported from the High-Resolution Rapid Refresh (HRRR) and MesoWest. HRRR is a NOAA real-time 3-km resolution, hourly updated, cloud-resolving, convection-allowing atmospheric model, initialized by 3 km grids with 3 km radar assimilation. MesoWest is a cooperative project between researchers at the University of Utah, forecasters at the Salt Lake City National Weather Service Office, the NWS Western Region Headquarters, and personnel of participating agencies, universities, and commercial firms. MesoWest provides access to the current and archived weather observations across the United States. MesoWest relies upon weather observing networks that are managed by government agencies, private firms, and educational institutions. The weather data 1812 may be live, streamed data as well as historical data for the region of interest.

Often, fire models accept a point of ignition as the initial condition of the rasterized fire spread. However, due to the associated uncertainties with the early location of the fire, this point of ignition may be changed such that the current model accepts multiple ignition points as well as multiple ignition sites, also known as the scar-site. By leveraging this capability, the fire forecasting benefits from the most accurate early estimates of the fire location as its initial conditions. The outcomes of the fire monitoring products are evaluated based on the metrics and previous forecast simulations. After pre-processing the fire perimeters through both shape and time-dependent metrics, the results are imported as scar-site information 1814 to the fire model 1820.

Furthermore, any other sources of perimeter data, user inputs, social media analysis outputs 1806, etc., can be imported to estimate the initial ignition site, and used for the determination of the scar-site information 1814.

Information from the fire monitoring 1808 is used as inputs for the fire model 1820 of the fire forecasting. Fire monitoring 1808 calculates, among other things, the fire perimeter 1816 and the Fire Radiative Power (FRP) 1818, which is a measure of the rate of radiant heat output from a fire. The fire perimeter 1816 determines the boundaries of the area or areas that are burning or have burnt. From the fire perimeter 1816 and the FRP 1818, two metrics 1824 are calculated: the shape of the fire region, and a time metric that includes a time series of the evolution of the fire. The metrics 1824 may be input directly to the fire model 1820 or incorporated through the scar-site information 1814. Additionally, the outputs 1826 of the fire model 1820 may also be used to recalculate the metrics 1824.

Other existing solutions do not take into consideration the information from the fire monitoring 1808, and just develop fire-spread models that do not have any type of validation data points that may be checked against the actual position of the fire. In some example embodiments, by utilizing the fire monitoring 1808 inputs, it is possible to refine fire forecasting with new data about the fire, as it becomes available, thereby continuously improving the results of the fire forecasting.

The fire model 1820 includes one or more fire formulas 1821, database 1822, and the calculation of the ROS equation 1823. The database 1822 is for storing fire data, such as the Landfire data, weather data, fire maps, etc. In some example embodiments, the fire model 1820 includes concurrent programming for generating the outputs 1826. The fire model 1820 is able to incorporate live dynamic features to generate quick updates to the outputs 1826.

The ROS is the horizontal distance that the flame zone moves per unit of time (e.g., feet per minute, meters per minute) and usually refers to the head fire segment of the fire perimeter. However, ROS can be measured from any point on the fire perimeter in a direction that is perpendicular to the perimeter. Because the ROS can vary significantly over the area of the fire, it is generally taken to be an average value over some a predetermined period of time. The fastest ROS is along the forward moving perimeter located at the head of the fire. The slowest ROS will be found on the windward (back) side of the perimeter. The ROS along the flanks will be intermediate between the head and backing rates of spread. The rates of spread may be estimated by timing the passage of the flaming front between two landmarks of known distance apart. To determine the ROS within the interior of a fire, firecrackers placed at known intervals along a transect perpendicular to the flame front may be used. Other traditional methods for measuring rates of spread involve videography or the use of thermocouples to record the passage of the flaming front.

The ROS is directly related to the amount of heat received by the fuels ahead of the flaming zone, and the heat is a function of the energy release rate per unit area of fire front, where the reaction intensity $I_R$ is measured as BTU/ft$^2$/minute.

The ROS as a function of energy release was mathematically expressed by Rothermel's equation. In simple terms, the ROS equation is the heat received by fuels ahead of the fire (numerator) divided by the heat required to ignite the fuels (denominator). Rothermel's equation may be used to calculate the ROS, as follows:

$$ROS = I_R \xi (1 + \Phi_W + \Phi_S) / \rho_n \varepsilon Q_{ig}$$

In this equation, ROS is the rate of spread of the flaming front, $I_R$ is the reaction intensity, $\xi$ is the proportion of the reaction intensity that heats adjacent fuel particles to ignition, $\Phi_W$ is the dimensionless multiplier accounting for the effect of wind in increasing the proportion of heat that reaches adjacent fuels, $\Phi_S$ is the dimensionless multiplier accounting for the effect of slope in increasing the proportion of heat that reaches adjacent fuels, $\rho_n$ is the oven dry fuel per cubic foot of fuel bed (lb/ft), $\varepsilon$ is the dimensionless number accounting for the proportion of a fuel particle that is heated to ignition temperature at the time flaming combustion starts (near unity for fine fuels and decreases toward zero as fuel size increases), $Q_{ig}$ is the heat of pre-ignition or the amount of heat required to ignite one pound of fuel (BTU/lb).

As Rothermel's equation shows, the ROS is strongly influenced by fuels, winds, and topography, where the ROS generally increases with increasing wind speed, slope, and amount of fine fuels.

When fire growth leads to extreme fire behavior, the fire itself becomes a fourth factor that influences the ROS. Fire can produce enough heat to modify local winds, contribute to atmospheric instability, and cause cloud development.

In some example embodiments, the simulations of the fire model begin with the information from the fire monitoring 1808, that is, the exact current situation of the fire, and then the fire forecast is calculated.

In some example embodiments, Monte Carlo simulations and time-series analysis are utilized by the fire model 1820.

The results are combined to resolve the spectrum of uncertainty of the fire forecast within the whole region.

Monte Carlo simulations, also referred to as Monte Carlo experiments, are a broad class of computational algorithms that rely on repeated random sampling to obtain numerical results. Their essential idea is using randomness to solve problems that might be deterministic in principle. They are sometimes used in physical and mathematical problems and are most useful when it is difficult or impossible to use other approaches.

In physics-related problems, Monte Carlo simulations are useful for simulating systems with many coupled degrees of freedom, such as fluids, disordered materials, strongly coupled solids, and cellular structures. In principle, Monte Carlo methods can be used to solve problems having a probabilistic interpretation. By the law of large numbers, integrals described by the expected value of some random variable can be approximated by taking the empirical mean (e.g., the sample mean) of independent samples of the variable.

In some example embodiments, the fire model 1820 uses what is referred to as an ensemble mode that utilizes Monte Carlo simulations to capture the combinations of weather data, fuel data, etc., to determine a time series describing how the fire will evolve over time, such as, for example, within 30 minutes, one hour, six hours, 12 hours, 24 hours, 48 hours, etc. If the weather is changing over time, the simulations for the different periods of time will reflect the change in the weather.

In some example embodiments, the fire formulas 1821 may include a Surface Fire Spread with FiremodsS adjustments (Albini 1976): Crown Fire Initiation Passive/Active (Van Wagner 1977); Crown Fire Spread (Cruz 2005); Flame Length and Fire Line Intensity (Byram 1959); Midflame Wind Adjustment Factor (Albini & Baughman 1979) parameterized as in BehavePlus; FlamMap, FSPro, and FPA according to Andrews 2012: Fire Spread on a Raster Grid (Morais 2001), or any combination thereof. In another example embodiments, other fire formulas 1821 may also be utilized.

Further, different fuel models may be utilized in different embodiments, such as no dynamic loading from Anderson, and dynamic loading based on Scott & Burgan.

In fire forecasting, it is useful to separate the ROS model (outputs in distance per unit time) and a fire solver which solves the spatial spread of the fire for a given time to estimate the Fire Footprint. In some example embodiments, the fire solver is GridFire, which is a raster-based fire spread and severity model that may be used for both static and dynamic calculations of various standard fire behavior metrics across a landscape. For inputs, GridFire requires a stack of co-registered raster maps for the region of interest as well as a set of scalar values which may be input via a configuration file. In other example embodiments, other fire solvers may also be used.

In some example embodiments, the ROS model takes the input parameters as several grids (e.g., weather, fuel topography) and outputs a grid of ROS used by the Fire Solver. At a high level, the fire forecasting development process can be described by offline training, prognostic simulations, and online training.

The offline training estimates the ROS for the fire solver given a set of training events (e.g., known previous fires). This provides a machine-learning ROS. The prognostic simulations use stochastic simulations of fire spread by using one or more of the machine-learning ROS from the offline training, the machine-learning ROS with online training updates, and the original semi-empirical ROS where machine learning performs inadequately.

The online training updates the ROS based on the observed fire spread estimated by Fire Monitoring and the performance of the machine-learning ROS up to that point.

Since Rothermel's original equations assume that the wind direction and slope are aligned, the effects of cross-slope winds are taken into account in some embodiments.

Rothermel's formula provides no specific mechanism on how fire spreads through two or higher dimensional spaces. Therefore, extrapolation requires a trade-off between the number of dimensions and exponentially increasing computational complexity of fractal searches for fire front. In some example embodiments, a raster grid view is used to be able to reduce the computational complexity while being able to work directly with a variety of the datasets such as Landfire. This also reduces the geometric lookup step or a priori translation to vector spaces.

The original GridFire setup provides the capability to do static fire simulations, e.g., given input parameters, GridFire generates the outputs when the maximum runtime is reached. While this is useful for creating risk maps using Monte-Carlo type simulations, it is not suitable for accurate forecasting. In order to obtain reliable forecasts, the initial conditions are made as close as possible to the observation.

In order to resolve the initial-condition problem and provide reliable forecasts, the fire model inputs archived, current, and forecast weather data and incorporates them into the simulations. Furthermore, the initial conditions including the initial ignition site are set by the fire monitoring 1808 module. This removes the map search for ignition from the simulation procedures and also improves forecast accuracy. Moreover, since fuel models are encoded in the model, flexible initialization of the ignition site enables forecasting to take into account the suppression effects as well as the mitigation efforts into the forecasting outcomes.

Using the data sets of the known fires, distributions of the variables can be constructed, and Metropolis Monte Carlo simulations can be carried out for the given ROE, using sampling from the distributions. This leads to better cover of the uncertainty spectrum in the control parameter matrix, which leads to improved risk maps. Given the forecasts for the control parameters or time-history of variations, time-series analysis can be carried out for the ROE.

In some example embodiments, the outputs 1826 of the fire model 1820 include, at least, the termination of the fire perimeter, fire-line intensity, and flame height.

In some example embodiments, the inputs of the fire model 1820 include a plurality of values, as described below by way of example in Table 1.

TABLE 1

| Name | Units | Description |
|---|---|---|
| max-runtime | minutes | Maximum amount of time for generating output |
| cell-size | meters (or feet) | Size of the sides of the square cell |
| elevation-matrix | meters (or feet) | Defines terrain elevation on the cell |
| slope-matrix | — | Defines slope on the cell |
| fuel-model-matrix | fuel model numbers 1-256 | Matrix of categorical fuel maps provided by Landfire data set |

TABLE 1-continued

| Name | Units | Description |
| --- | --- | --- |
| canopy-height-matrix | meters (or feet) | Average height of the canopy in the cell |
| canopy-based-height-matrix | meters (or feet) | Data showing how tall is the base of the canopy, e.g., average height from the ground to a forest stand's canopy bottom. Specifically, the lowest height in a stand at which there is a sufficient amount of forest canopy fuel to propagate fire vertically into the canopy. |
| crown-bulk-density-matrix | $Kg/m^3$ (or $lb/ft^3$) | Density of vegetation in the cell |
| canopy-cover matrix | 0-100 | Percentage of ground in cell covered by vegetation |
| wind-speed | Km/hr (or mi/hr) | Speed of wind in the cell |
| wind-direction | degrees from North | Direction of wind in the cell |
| fuel moisture | percentage | Percentage of moisture of the vegetati on in the cell |
| foliar moisture | percentage | Moisture content of the fuel load at each location |
| ellipse-adjustment-factor | Scalar (dimensionless) | Scaling factor to calculate wind velocity at mid-flame height at the canopy height |
| initial-ignition-site | [0, 1] | 1 if the cell is the ignition site; 0 otherwise |
| initial-fire-line- intensity | BTU/mt/s (or BTU/ft/s) | Intensity of the fire on the fire perimeter |

In some example embodiments, the region being analyzed is represented by one or more matrices and a plurality of cells, where each cell represents a pixel. In some example embodiments, the fire model 1820 utilizes concurrent programming to be able to analyze each cell in parallel. Once the data for each of the cells is calculated, the data for all the cells is combined to obtain the information for the whole region.

The fire forecasting includes determining if the fire is spreading fast enough to ignite the next pixel (or hi-res pixel). This determination depends on several factors, such as if the pixel contains flammable material, the power output of the fire, wind, etc. By analyzing all pixels, it is possible to create a high-resolution map of the fire forecast.

In some example embodiments, the outputs 1826 of the fire model 1820 include a plurality of values, as described below in Table 2.

TABLE 2

| Name | Units | Description |
| --- | --- | --- |
| global-clock | minutes | Minutes elapsed from a time reference. |
| initial-ignition-site | [0, 1] | 1 if the cell is the ignition site; 0 otherwise |
| ignited-cells | [0, 1] | 0 if the cell is not on fire; 1 if the cell is on fire |
| fire-spread-matrix | [0, 1] | A matrix (map) of the impacted areas by fire |
| flame-length-matrix | meters (or feet) | Average height of flame in cell |

TABLE 2-continued

| Name | Units | Description |
| --- | --- | --- |
| fire-line-intensity | BTU/mt/s (or BTU/ft/s) | Intensity of the fire on the fire perimeter |

These values are calculated for each cell. In some example embodiments, the size of the cell is 30 m×30 m, but other cell sizes may be utilized.

Figure 19:
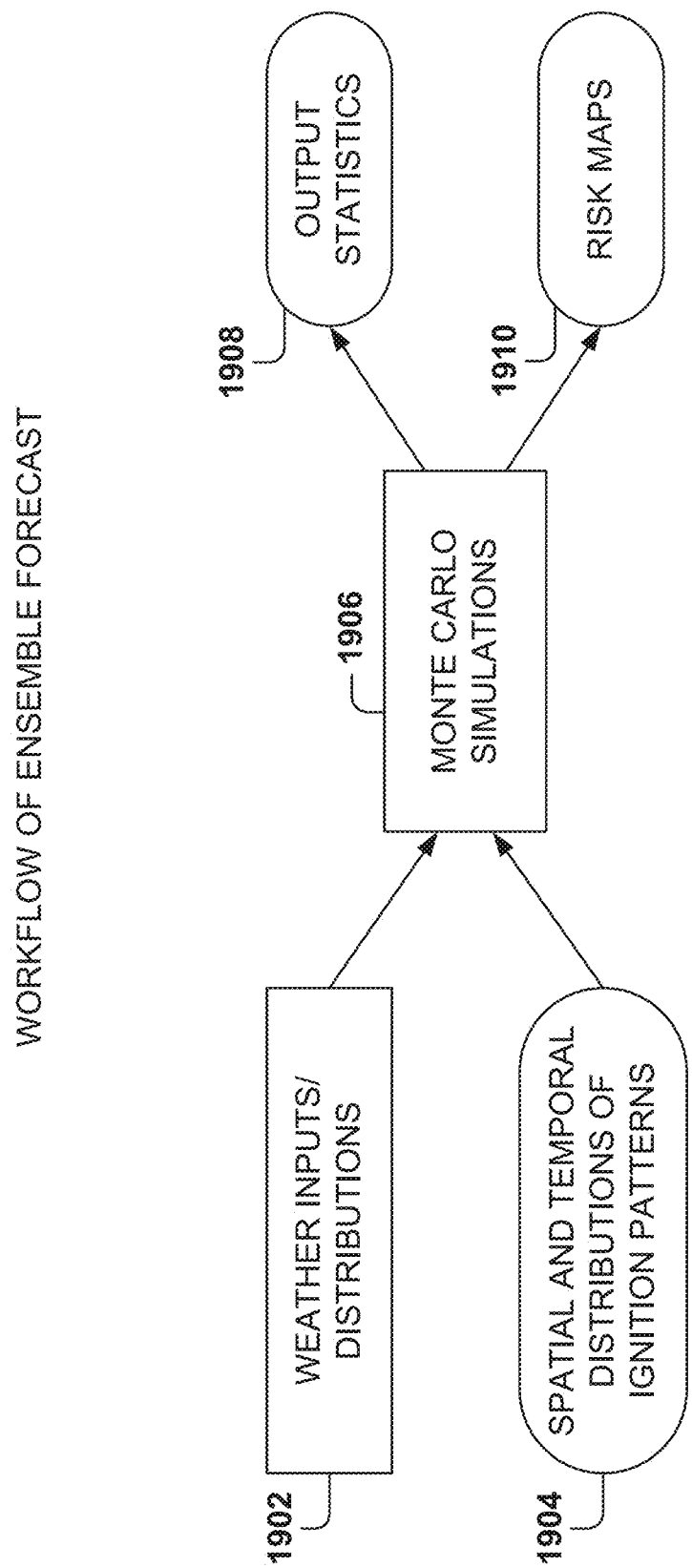
FIG. 19 illustrates a workflow of an ensemble forecast, performed by the computer system, according to some example embodiments.

FIG. 19 illustrates a workflow of an ensemble forecast, performed by the computer system, according to some example embodiments. FIG. 19 illustrates the high-level workflow for the Monte Carlo simulations 1906 of the fire forecasting model.

The inputs include, in some example embodiments, the weather information 1902 over the region being analyzed, which includes a temporal component of how the weather is predicted to change over the period under study in the simulation. Additionally, the inputs include information regarding the spatial and temporal distributions of ignition patterns 1904.

In some example embodiments, the results include the output statistics 1908 and risk maps 1910. The output statistics 1908 include data for the fire forecasting, including the time series regarding the evolution of the fire parameters, such as location, intensity, dangerous conditions, etc. The risk maps 1910 provide details on the evolution of the fire and the risks associated with the fire, such as danger to people and properties, as illustrated in FIGS. 6-13.

Figure 20:
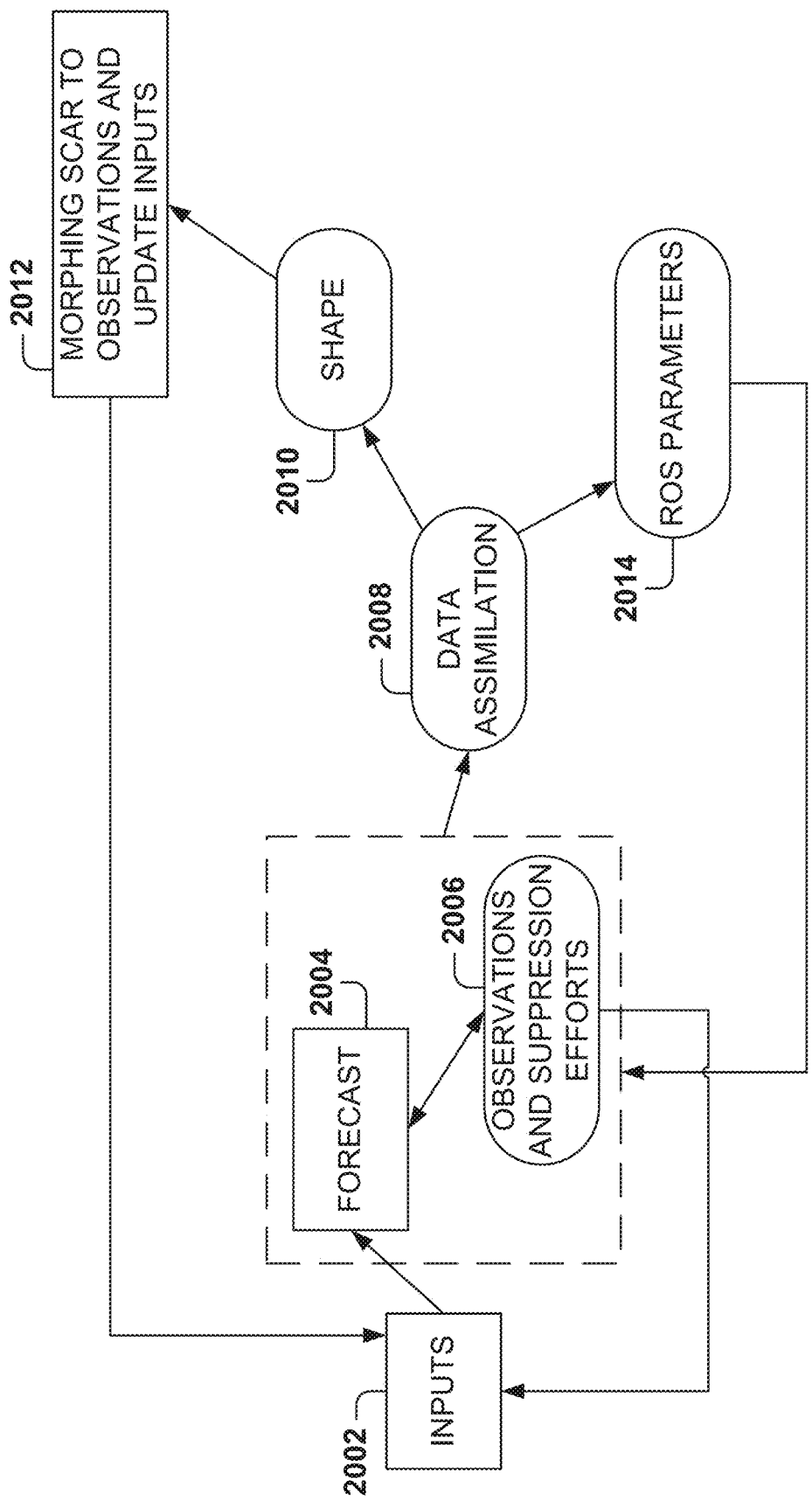
FIG. 20 illustrates the data-assimilation process, performed by the computer system, according to some example embodiments.

FIG. 20 illustrates the data-assimilation process, performed by the computer system, according to some example embodiments. As discussed above, the fire forecast 2004 utilizes inputs 2002 (e.g., weather data, fire data) and data regarding fire observations and suppression efforts 2006 to predict the evolution of the fire.

The observations may come from firefighters on the ground, from satellite images, or from other aerial images. The suppression efforts, also referred to as mitigation efforts, indicate the actions taken, or that will be implemented, to fight the fire, such as burning areas ahead of the fire, cutting trees, dumping water, etc. The impact of the suppression efforts is also taken into account to modify the prediction of how the fire would spread were those efforts not implemented.

The data assimilation module 2008 combines the results from the fire forecast 2004 with the field observations and suppression efforts 2006 in order to modify the fire predictions. The data assimilation module 2008 may include modifying the shape 2010 of the fire as well as the ROS parameters 2014. At operation 2012, the fire scar is morphed (e.g., transformed) to match the observations and update inputs 2002 to adjust the fire forecast 2004. The results are then used as inputs 2002 again to formulate a new fire forecast 2004. This way, as new observations are available, the data assimilation module 2008 allows for the modification of the fire forecast 2004 to increase in accuracy. This cycle may be repeated to continue improving the accuracy of the fire forecast 2004 and present it on a map.

In some example embodiments, the fire forecast 2004 is based on a model of GridFire, which is then modified to be able to adjust to the fire updates. GridFire is an open source fire behavior model. As inputs, GridFire takes the Landfire topography and fuel data (or equivalent raster layers provided by the user) and weather conditions that may be input directly, sampled from provided ranges, or looked up automatically from available online weather records. GridFire simulates fire ignition and spread over landscapes. Individual fires may be simulated as burning for a fixed number of hours and the resulting fire perimeter, burn type, flame lengths, fire line intensity, and spread rates examined under different weather conditions. GridFire relies on large scale Monte Carlo simulation, in which hundreds, thousands, or even millions of fires are simulated and analyzed in the aggregate. As discussed above, GridFire's outputs include the fire perimeter, the flame length, and the fire intensity.

In some example embodiments, the GridFire model is modified to take into consideration the updated fire monitoring information. GridFire utilizes Rasterized Fire Spread models, which are modified based on the updated fire monitoring data. A second way in which GridFire is modified is to incorporate the dynamic weather data as input parameters.

Some fire models, including GridFire, rely on an initial ignition point or starting point where the fire originated, and then model how the fire spreads from that initial ignition point. The problem is that most times, that initial ignition point is unknown and the fire model has to generate an estimation for the ignition point before generating fire forecasting results. Depending on where the initial ignition point is selected, the results will vary substantially because the models are highly known-linear.

By performing data assimilation, the fire forecast 2004 adjusts the GridFire equation parameters so that the current fire monitoring data matches the estimated ignition point. That is, the ignition point may change based on the observation data, which results in more accurate fire forecasting. Additionally, as the fire spreads, the ignition point effect is lowered as the fire perimeter is better known because of the fire-monitoring data.

The updating of the model may be referred to as "belief propagation," as new data (e.g., "beliefs" of the current situation) is available, the belief is propagated to improve the forecasting results so the fire-monitoring in the fire-forecasting components are aligned and consistent with each other.

Previous fire-forecasting methods typically make a forecast every 24 hours or more based on the information available at the time. However, fire spread is a non-linear process, so sudden changes may occur often, such as within an hour or two of the time when the fire forecast 2004 was made. The fire forecast 2004 is able to generate new forecasts often (e.g., every 30 minutes or less) as new data is available, which improves the ability of the firefighters to plan how to fight the fire and how to protect people and property because they have a better understanding of the fire perimeter and how the fire perimeter will evolve over time.

Figure 21:
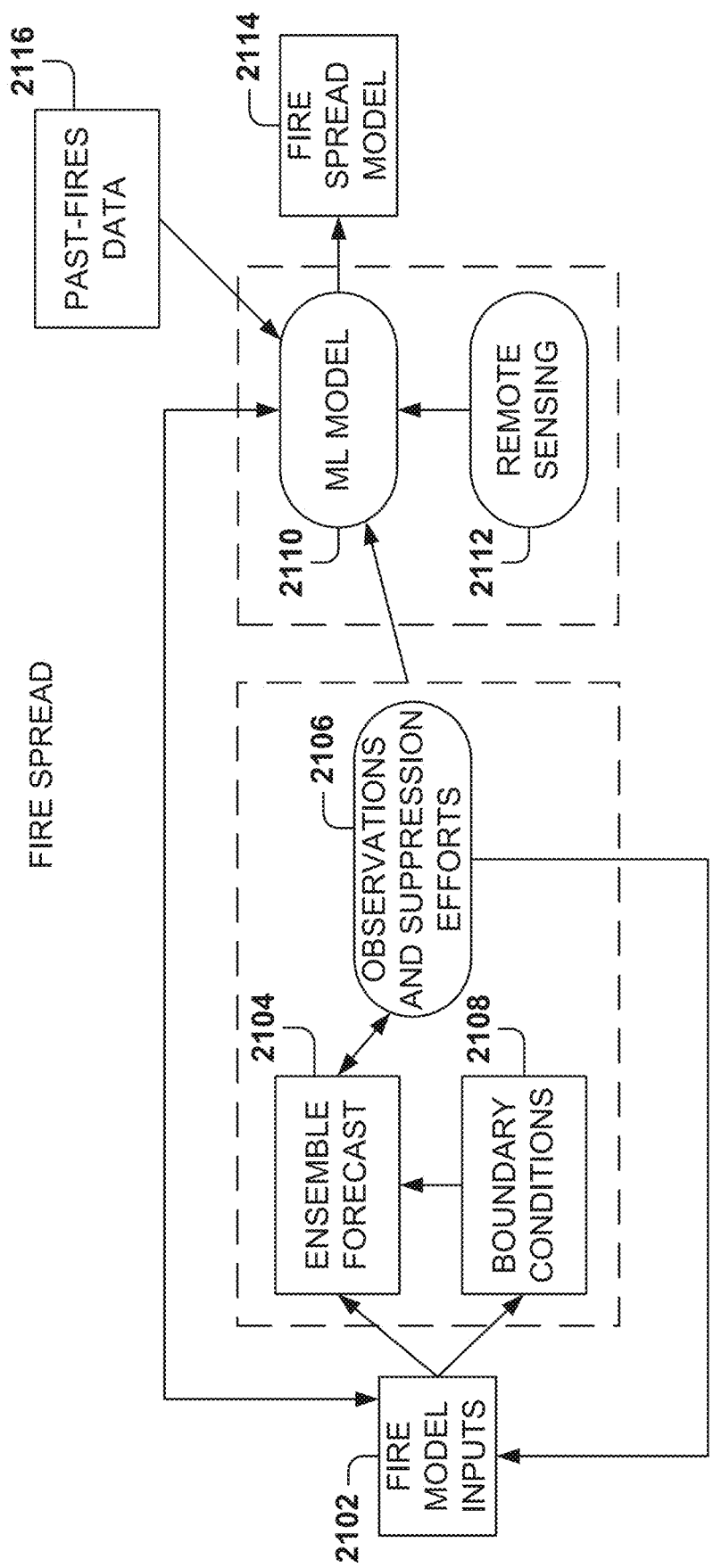
FIG. 21 illustrates a fire spread model utilizing a machine-learning approach, performed by the computer system, according to some example embodiments.

FIG. 21 illustrates a fire spread model utilizing a machine-learning approach, performed by the computer system, according to some example embodiments. The machine-learning model for fire forecasting utilizes the fire-related features (e.g., features 1702 described above with reference to FIG. 17), including the current state of the fire, to develop a fire spread model 2114 that produces an estimation of the fire evolution over time. Therefore, the machine-learning model does not rely on the physics-based model to determine the fire spread, although, in some example embodiments, the information from both the machine-learning model and the data-assimilation model may be combined to forecast the fire evolution.

The ensemble forecast model 2104 utilizes information regarding the fire boundary conditions 2108 and information from observations and the implemented suppression efforts to generate the fire forecast.

In the architecture illustrated in FIG. 21, the ensemble forecast 2104 is used as an initial forecast and the output is then used to train the machine-learning (ML) model 2110 to generate fire forecasts, e.g., the fire spread model 2114. Once the ML model 2110 is trained, it is possible to produce fire estimates without using the ROS equations. Further, information from past fires 2116 may also be used to train the ML model 2110. That is, the ML model 2110 is initially based on the ROS equations to fine tune the prediction capabilities and the selection of the features and how each feature affects the ML model 2110.

Eventually, as the ML model 2110 increases accuracy, the ROS equations are not needed, and the fire forecasting may be performed using the ML model 2110.

The ML model 2110 may use any of the models described above, such as Logistic Regression (LR), Naive-Bayes, Random Forest (RF), neural networks (NN), deep neural networks (DNN), matrix factorization, and Support Vector Machines (SVM). The features used for fire monitoring and fire forecasting may vary and any subset of the features described above may be utilized for each method. Additionally, remote sensing information 2112 may be used as inputs to the ML model 2110, which includes additional information regarding the state of the fire or conditions that may affect the fire spread.

By combining the predicting strengths of the physics-based model and the ML model, the accuracy of the fire forecasting state over time is improved.

Figure 22:
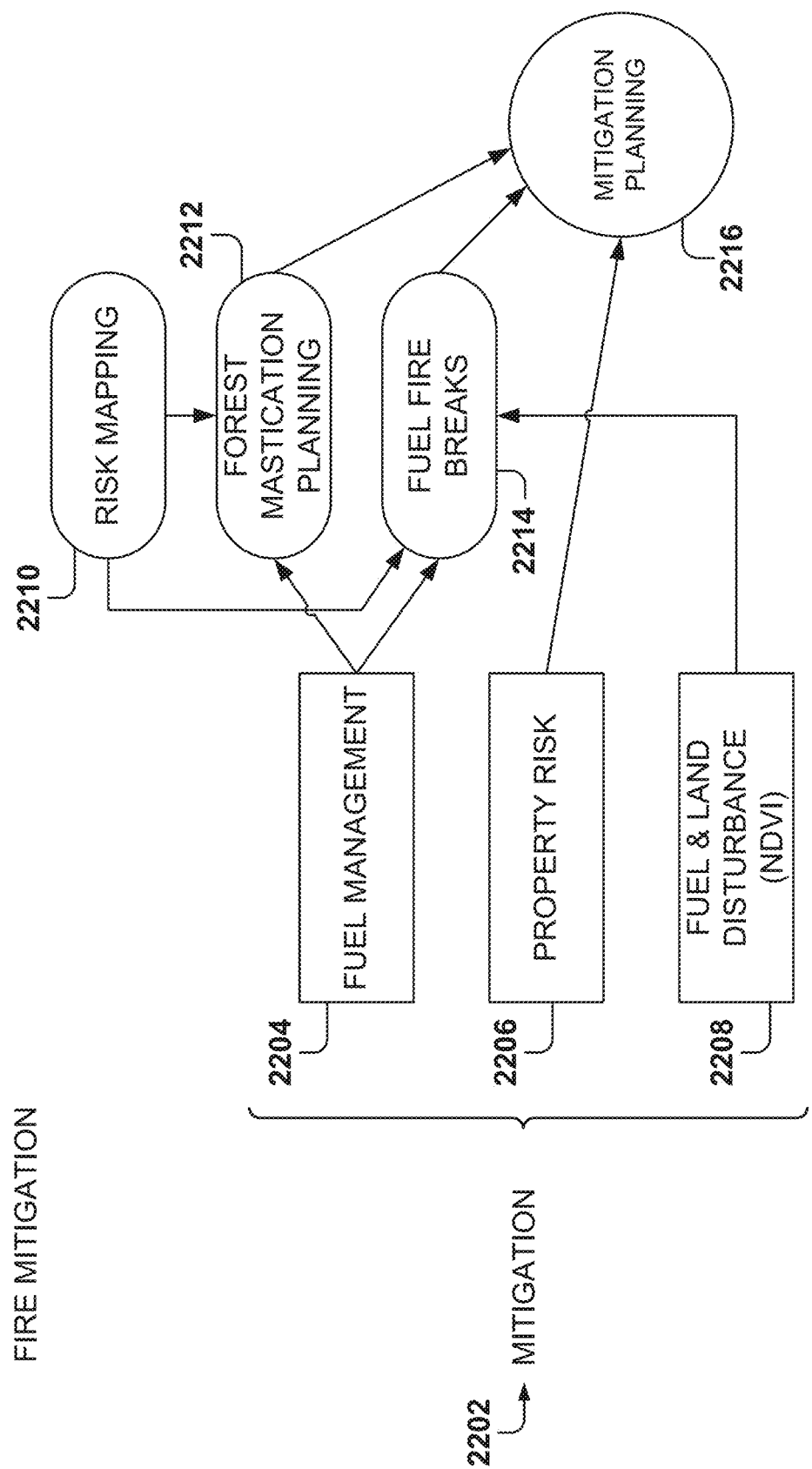
FIG. 22 is hardware architecture to mitigate fire spread, according to some example embodiments.

FIG. 22 is hardware architecture to mitigate fire spread, according to some example embodiments. "Mitigation" refers to the actions that may be taken in the community to lower the negative effects of fire in a region or a community. One goal of implementing mitigation activities is to reduce the risk to people, property, and land.

Mitigation 2202 includes three areas: fuel management 2204, property risk 2206, and fuel and land disturbance 2208. Fuel management 2204 analyzes the fire fuel (e.g., combustible materials) in the region and designs measures to reduce the amount of fuel for the fire in order to decrease the possible destruction by fire and the spread of the fire.

One component of fuel management 2204 is forest mastication planning 2212, which involves chopping and crushing vegetation to reduce the amount of fuel in the region. Another component of fuel management 2204 is the addition of fuel fire breaks 2214. A typical fire break is an area where all vegetation is eliminated to stop the spread in case of fire, although other fire breaks may also be used, such as flooding areas to stop the fire spread with water barriers. Another type of fuel fire break involves managing the perimeters around homes to eliminate vegetation in the perimeter in order to avoid or delay the spread of the fire to the homes. The defense of homes may also suggest the changing of materials in the home to defend against fire, such as changing roof tiles to noncombustible materials.

Risk mapping 2210 determines the probabilities that fire events may take place throughout the region, and the risks may then be used to prioritize the forest mastication planning 2212 and the fuel fire breaks 2214.

Property risk 2206 analysis may be used to determine the properties at risk in the area. The fuel and land disturbance 2208 is used to determine the effects of changes in the fuel and the topology with respect to fire effects. In some embodiments, the Normalized Difference Vegetation Index (NDVI) is used for the monitoring of vegetation dynamics from regional to global scales. The NDVI has been usually considered a reliable indicator of plant biomass and vegetation primary productivity. Therefore, NDVI time series have been routinely used to measure vegetation dynamics and ecosystem phenology over large geographic areas. The results of the fuel and land disturbance 2208 analysis is used as another input for selecting possible fuel fire breaks 2214.

Mitigation planning 2216 includes the analysis of possible measures to reduce the impact of fires, their cost and their rewards. This way, a community manager may put a price on a given measure and be able to justify the potential return (e.g., a dollar spent in mitigation may result in a one hundred-dollars reduction in damages in case of fire).

Mitigation planning 2216 utilizes the outputs from the forest mastication planning 2212, the fuel fire breaks 2214, and the property risk 2206 to identify possible mitigation measures.

The mitigation measures may be presented in a user interface indicating the estimated cost and the possible rewards. For example, possible fire breaks may be shown on a map indicating the ability of each fire break to stop fire or reduce the fire spread speed. Additionally, the mitigation measures may also indicate the people at risk in the community and how each of the measures will contribute to keep the people safe. For example, demographic information may be provided to indicate areas where elderly people may be at a high risk.

Figure 23:
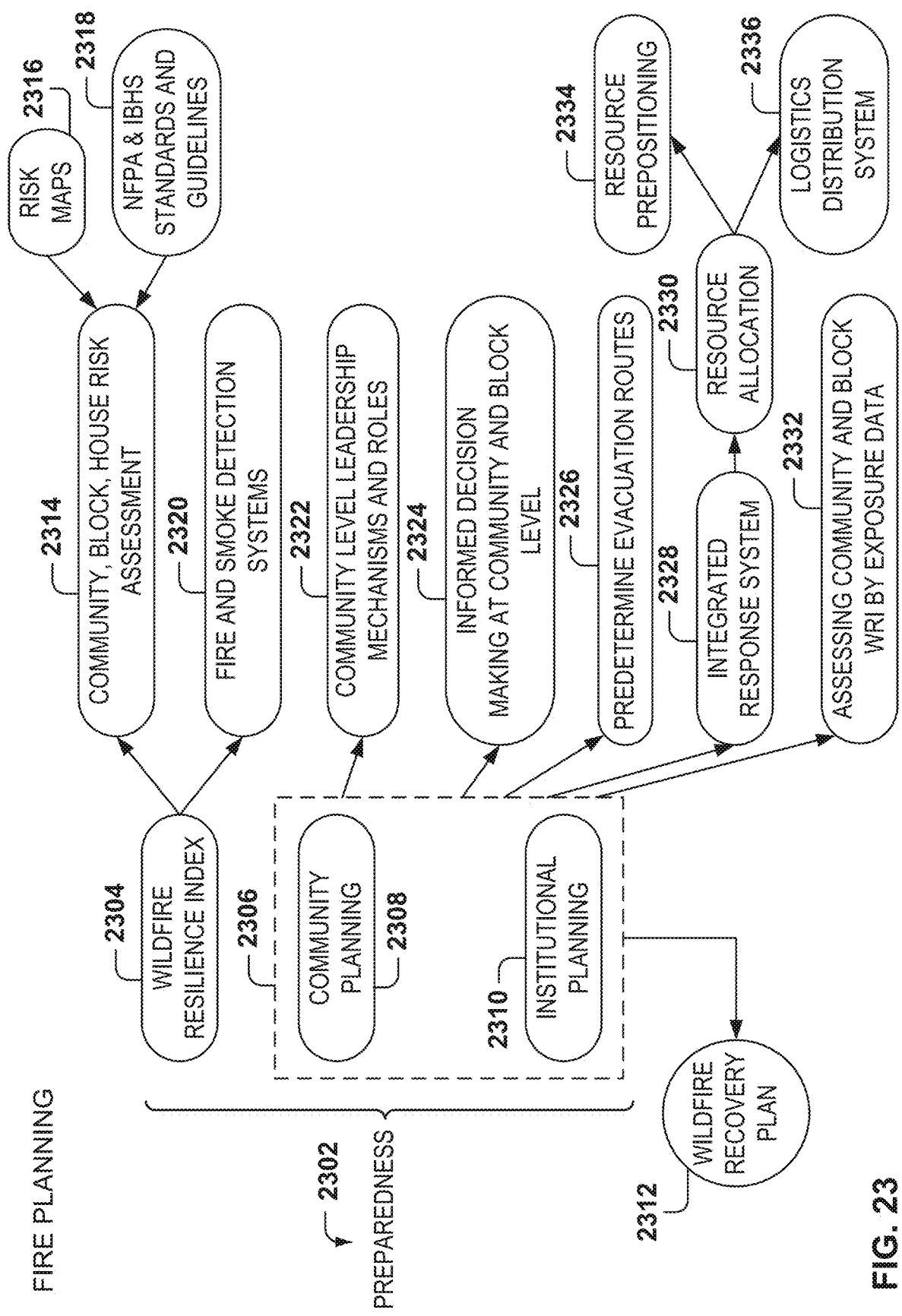
FIG. 23 is hardware architecture for fire-protection planning, according to some example embodiments.

FIG. 23 is hardware architecture for fire-protection planning, according to some example embodiments. Preparedness 2302 relates to planning for the future on how to build a community in order to be resilient to the effects of fire. Preparedness 2302 includes calculating the wildfire resilience index 2304 and fire planning 2306, which includes community planning 2308 and institutional planning 2310.

The wildfire resiliency index 2304 is an index that indicates how resilient to fire a community is. The wildfire resiliency index 2304 is based on a plurality of factors, such as fire fuel in the area, buildings in the area and the materials used in those buildings, weather patterns in the area, availability of response plans to fire events, etc.

The wildfire resiliency index 2304 includes assessments of risk 2314 at the community, block, and house level, and may use inputs from the risk maps 2316 as well as the standards and guidelines 2318 from the National Fire Protection Association (NFPA) and the Insurance Institute for Business and Home Safety (IBHS). The wildfire resiliency index 2304 may also consider fire and smoke detection systems 2320 and their availability throughout the region in commercial buildings, government buildings, and private residences.

Community planning 2308 is related to planning activities by officials in charge of making plans for the community, such as standards for new buildings and guidelines for improving fire resiliency in existing buildings. Similarly, institutional planning 2310 relates to fire planning by private institutions, such as businesses and nonprofit organizations.

The result of the planning 2306 may be integrated into a wildfire recovery plan 2312 that describes how to recover from the effects of fire in the community.

Further, planning 2306 may take into consideration a plurality of factors, such as community level leadership mechanism and roles 2322, informed decision-making at the community and block level 2324, predetermination of evacuation routes 2326, an integrated response system 2328 to manage how to respond to emergencies due to fire, and the assessment 2332 of community and block wildfire resiliency index based on the exposure data.

The integrated response system 2328 will determine the allocation of resources 2330 for building fire resiliency, fighting fires, and assisting the community during fires, which includes resource prepositioning 2334 and a logistics distribution system 2336.

Figure 24:
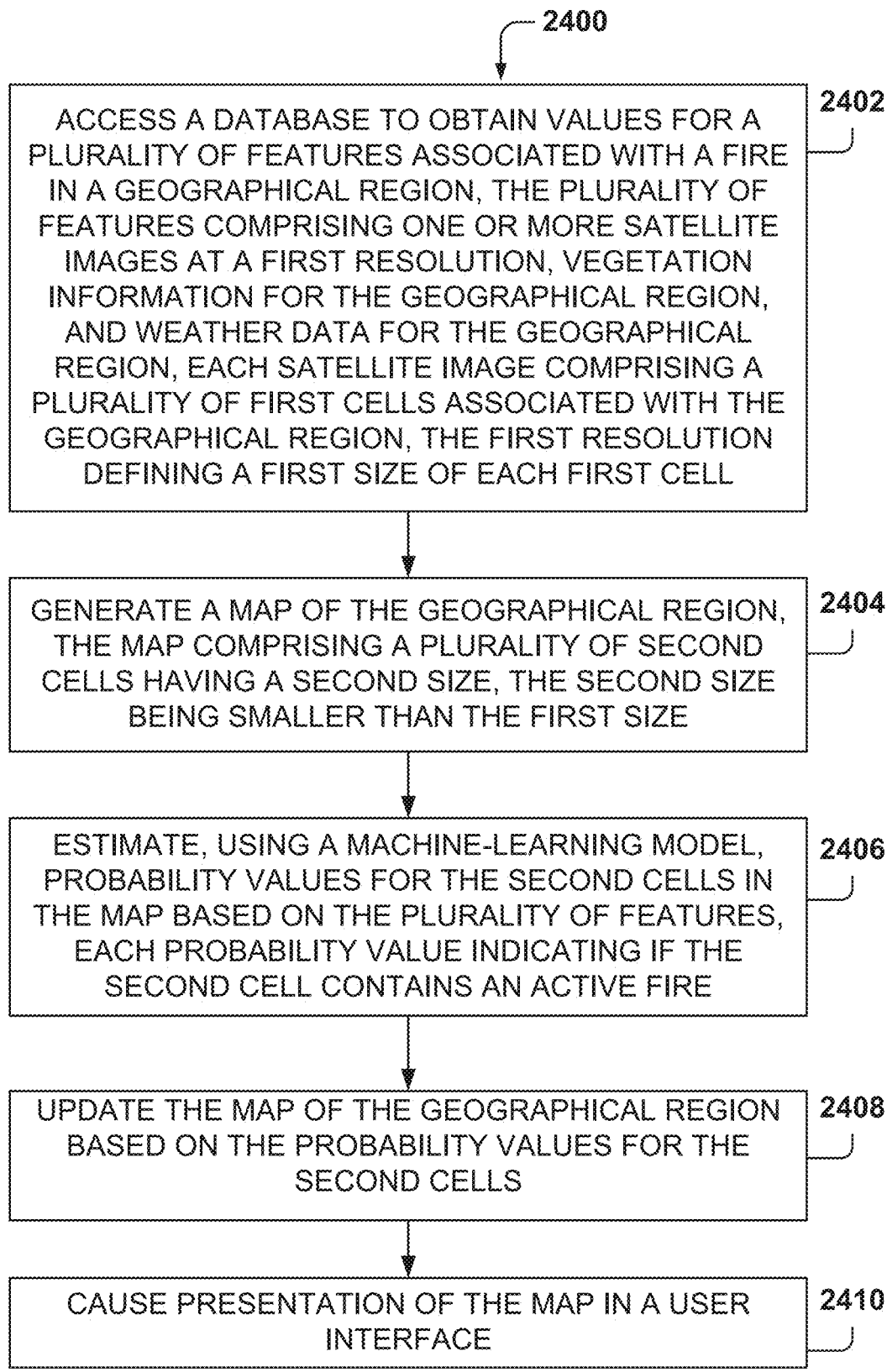
FIG. 24 is a flowchart of a method for monitoring the spread of a fire, according to some example embodiments.

FIG. 24 is a flowchart of a method 2400 for monitoring the spread of a fire, according to some example embodiments. While the various operations in this flowchart are presented and described sequentially, one of ordinary skill will appreciate that some or all of the operations may be executed in a different order, be combined or omitted, or be executed in parallel.

At operation 2402, a computer system accesses a database to obtain values for a plurality of features associated with a fire in a geographical region. The plurality of features comprise one or more satellite images at a first resolution, vegetation information for the geographical region, and weather data for the geographical region. Each satellite image includes a plurality of first cells associated with the geographical region, and the first resolution defines a first size of each first cell.

From operation 2402, the method 2400 flows to operation 2404 for generating a map of the geographical region that comprises a plurality of second cells having a second size, where the second size is smaller than the first size.

From operation 2404, the method 2400 flows to operation 2406 where the machine-learning model estimates probability values for the second cells in the map based on the plurality of features, each probability value indicating if the second cell contains an active fire.

At operation 2408, the map of the geographical region is updated based on the probability values for the second cells.

From operation 2408, the method 2400 flows to operation 2410 for causing presentation of the map in a user interface.

In one example, the method 2400 further comprises before estimating the fire values, training the machine-learning model with values of the plurality of features from previous fires.

In one example, the plurality of features further includes land-related features that include land use, slope, aspect, elevation, and soil moisture.

In one example, the plurality of features further includes hour of the day, Normalized Difference Vegetation Index (NDVI), and Normalized Difference Built-up Index (NDBI).

In one example, the vegetation information includes canopy height, canopy cover, canopy bulk density, and drought index; wherein the weather data includes wind, precipitation, temperature, humidity, and cloud cover.

In one example, the method 2400 further comprises estimating, by the machine-learning model, second cells with embers that may ignite fires; and presenting, in the map, an ember area with second cells that comprise embers that may ignite fires.

In one example, the method 2400 further comprises estimating a fire scar area with second cells that have already burnt; and causing presentation, in the user interface of the map, the fire scar area.

In one example, the one or more satellite images include images in a plurality of frequency bands.

In one example, the first side size is a square with 375 meter sides and the second size is 30 meter sides.

In one example, the method 2400 further comprises receiving observations about a state of the fire in the geographical region, and updating the probability values for the second cells based on the received observations.

Figure 25:
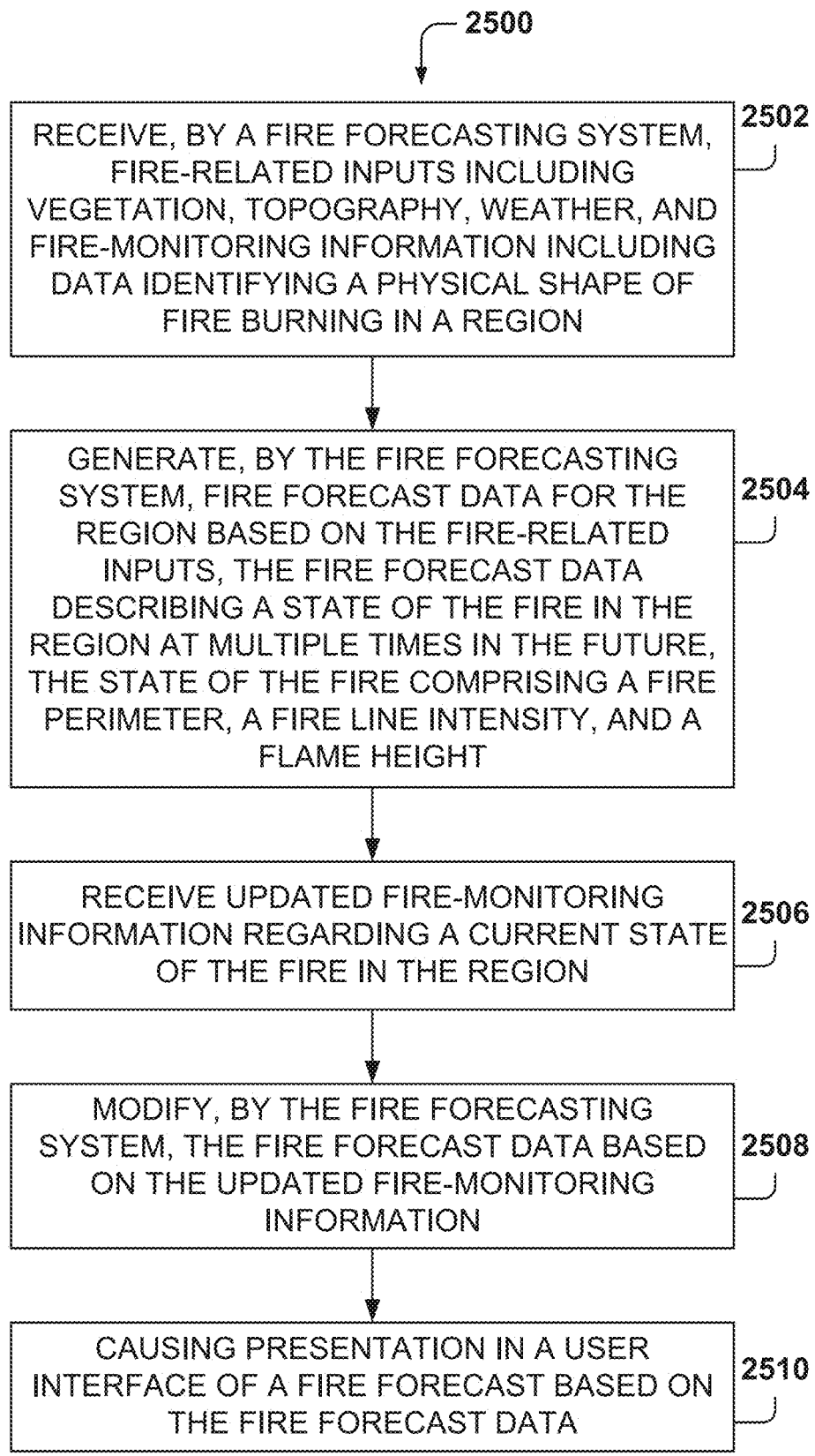
FIG. 25 is a flowchart of a method for updating the fire spread model based on fire-status updates, according to some example embodiments.

FIG. 25 is a flowchart of a method 2500 for updating the fire spread model based on fire-status updates, according to some example embodiments. While the various operations in the method 2500 are presented and described sequentially, one of ordinary skill will appreciate that some or all of the operations may be executed in a different order, be combined or omitted, or be executed in parallel.

At operation 2502, fire-related inputs are received, via a computer network and by a fire forecasting system, that include vegetation data, topography data, weather data, and fire-monitoring information including data identifying a physical shape of fire burning in a region.

From operation 2502, the method 2500 flows to operation 2504 where the fire forecasting system generates fire forecast data for the region based on the fire-related inputs. The fire forecast data describes a state of the fire in the region at multiple times in the future, and the state of the fire comprises a fire perimeter, a fire line intensity, and a flame height.

From operation 2504, the method 2500 flows to operation 2506 for receiving, via the computer network, updated fire-monitoring information regarding a current state of the fire in the region. At operation 2508, the fire forecasting system modifies the fire forecast data based on the updated fire-monitoring information.

From operation 2508, the method 2500 flows to operation 2510 for presenting in a user interface a fire forecast based on the fire forecast data.

In one example, generating the fire forecast data includes utilizing a physical model to determine fire spread data based on the fire-related inputs, and combining the fire spread data of the physical model with fire spread data estimated by a machine-learning program to determine a combined fire spread data. The fire spread data is included in the fire forecast data and describes the physical shape of the fire burning in the region for the multiple times in the future.

In one example, the region is divided into cells, wherein the fire forecast data includes an indication of whether each cell is on fire.

In one example, generating the fire forecast data includes determining an estimated point of ignition of the fire, and modifying the fire forecast comprises adjusting the estimated point of ignition of the fire based on the updated fire-monitoring information.

Further, in one example, generating the fire forecast comprises determining a rate of spread of the fire from the fire perimeter.

In one example, generating the fire forecast includes determining a scar area in the region for the multiple times in the future. The scar area identifies which parts of the region have already burnt.

In one example, generating the fire forecast includes identifying geographical blocks within the region that include residential dwellings and determining a risk level from fire for these geographical blocks.

In one example, the region is divided into a plurality of cells and the fire forecast includes, for each cell of the plurality of cells, one or more of slope of the terrain, fuel-model, average canopy-height in the cell, vegetation density in the cell, percentage of canopy cover in the cell, wind speed, wind direction, percentage of fuel moisture of vegetation in the cell, foliar moisture, and a flag indicating if the cell is an initial ignition site.

In one example, generating the fire forecast includes accessing information from physical models for the fire spread and combining the information from physical models for the fire spread with estimates from a machine-learning program.

In one example, the machine-learning program utilizes values from a plurality of features selected from a group consisting of satellite images, vegetation information for the region, weather data, land use, slope, aspect, elevation, and soil moisture.

In one example, the vegetation data includes information fire fuel in the region, and the topography data includes information regarding changes on the landscape caused by management activities and natural disturbance.

Figure 26:
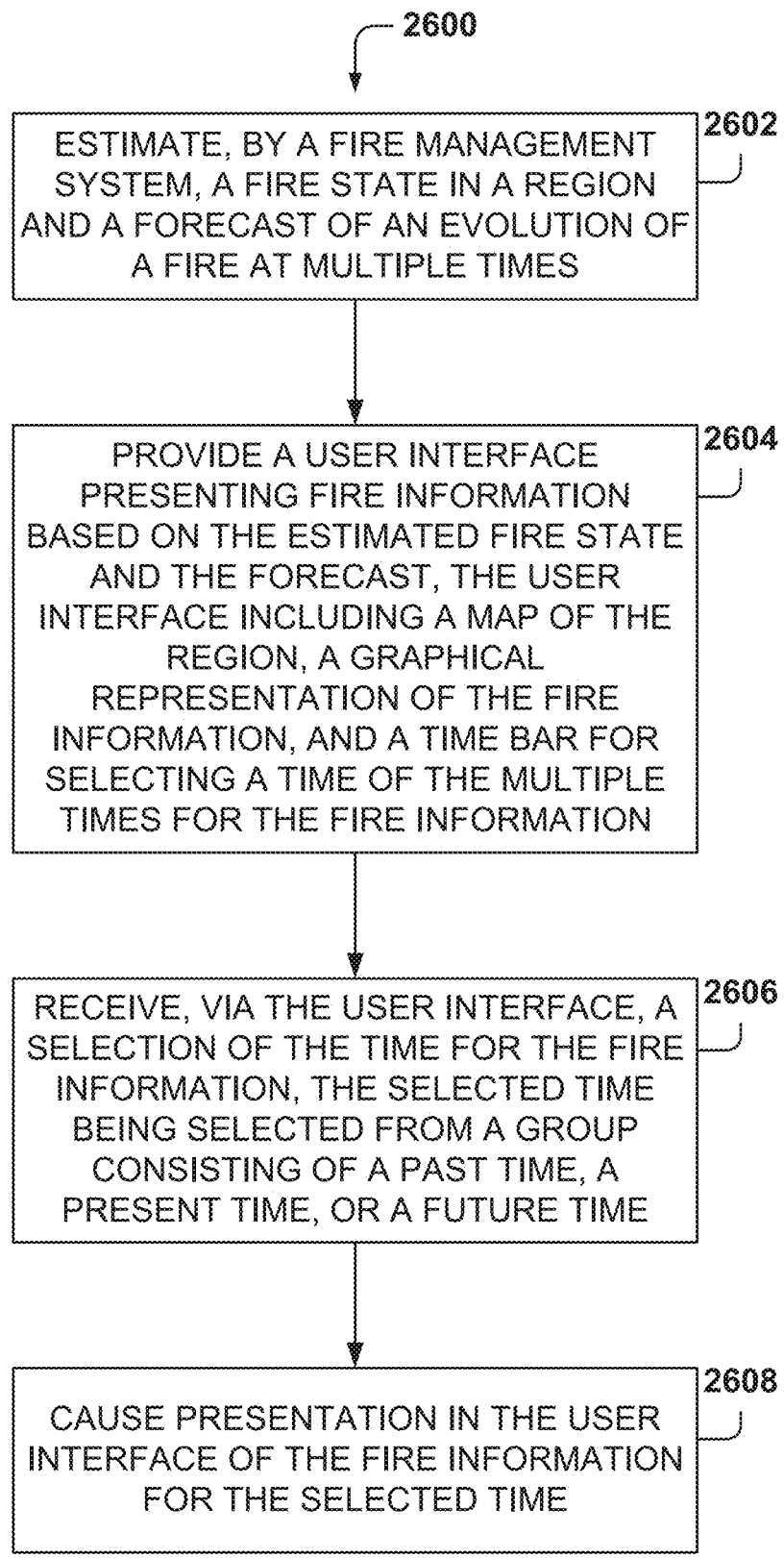
FIG. 26 is a flowchart of a method for providing a user interface to monitor the spread of fire over time, according to some example embodiments.

FIG. 26 is a flowchart of a method 2600 for providing a user interface to monitor the spread of fire over time, according to some example embodiments. While the various operations in this flowchart are presented and described sequentially, one of ordinary skill will appreciate that some or all of the operations may be executed in a different order, be combined or omitted, or be executed in parallel.

Operation 2602 is for estimating, by a fire management system, a fire state in a region and a forecast of an evolution of a fire at a plurality of times. From operation 2602, the method flows to operation 2604 where the fire management system provides a user interface for presenting fire information based on the estimated fire state and the forecast. The user interface includes a map of the region, a graphical representation of the fire information, and a time bar for selecting a time of the plurality of times for the fire information.

From operation 2604, the method flows to operation 2606 for receiving, via the user interface, a selection of the time for the fire information. The selected time is selected from a group consisting of a past time, a present time, or a future time. At operation 2608, the fire management program causes presentation in the user interface of the fire information for the selected time.

In one example, when the selected time is the past time, the user interface shows fire-monitoring information for the past time. When the selected time is the present time, the user interface shows the fire state at the present time. When the selected time is the future time, the user interface shows fire forecast information for the selected time.

In one example, the map includes a burnt scar where fire has burnt, and active-fire area, and a fire perimeter. Further, the map may include regions with a likelihood of fire based on ignition probability, and the map may include an ember area where ember may travel from the fire burning in the region.

In one example, the time bar includes a time scale and a selector for identifying the selection of the time for the fire information. Further, in one example, the map includes an option for showing prevailing winds in the region, wherein the map includes a boundary line showing where wind direction changes in the region.

In one example, the map may include fire-fuel type throughout the region. Further, the map may include an estimated fire-damage risk by city block, wherein the user interface includes a window with demographic information of population at risk in the region. Further yet, the map may include instability areas where fire exhibits volatile behavior.

Figure 27:
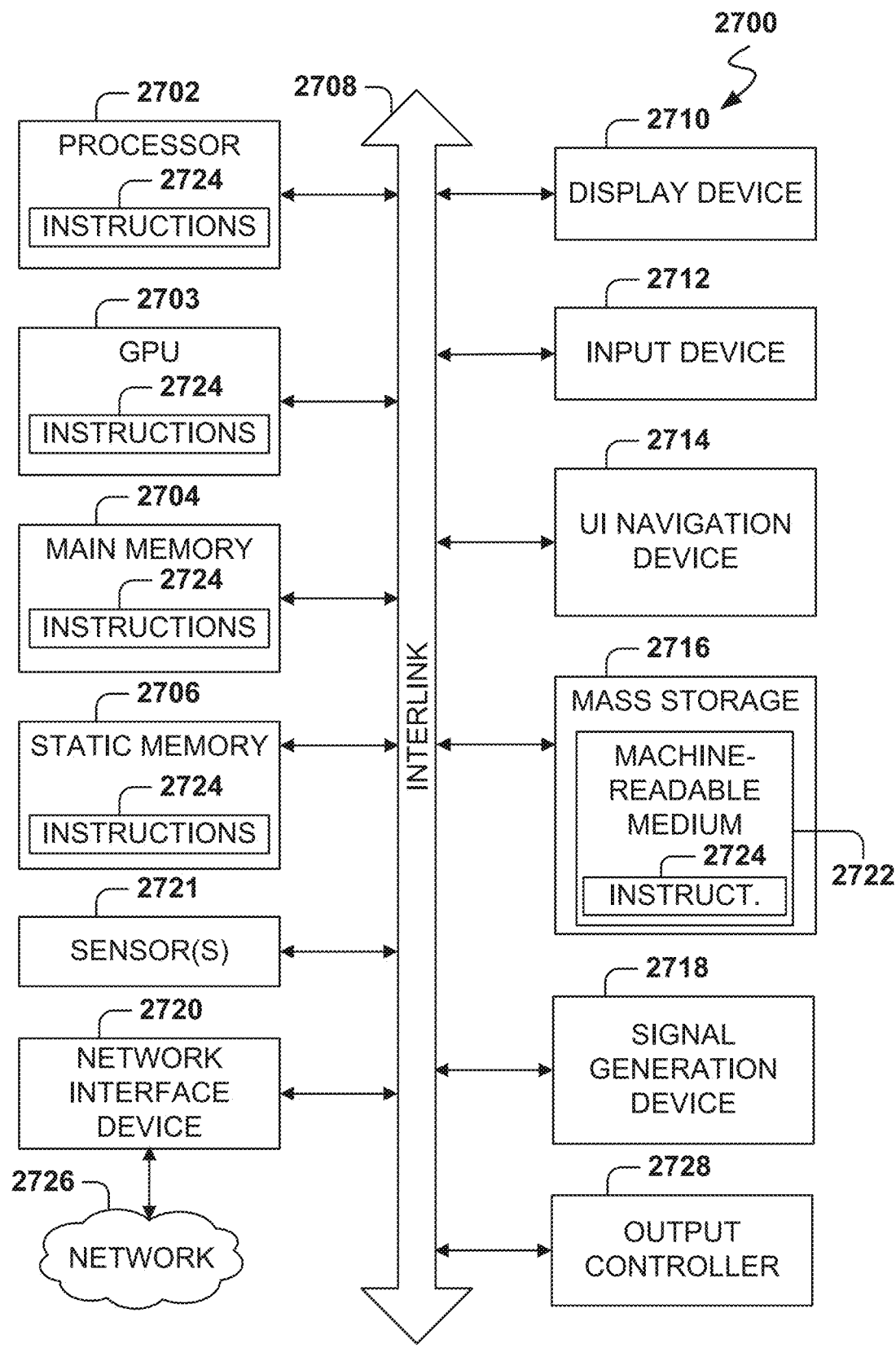
FIG. 27 is a block diagram illustrating an example of a machine upon or by which one or more example process embodiments described herein may be implemented or controlled.

FIG. 27 is a block diagram illustrating an example of a machine 2700 upon or by which one or more example process embodiments described herein may be implemented or controlled. In alternative embodiments, the machine 2700 may operate as a standalone device or may be connected (e.g., networked) to other machines. In a networked deployment, the machine 2700 may operate in the capacity of a server machine, a client machine, or both in server-client network environments. In an example, the machine 2700 may act as a peer machine in a peer-to-peer (P2P) (or other distributed) network environment. Further, while only a single machine 2700 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 2700 may include a hardware processor 2702 (e.g., a central processing unit (CPU), a hardware processor core, or any combination thereof), a graphics processing unit (GPU) 2703, a main memory 2704, and a static memory 2706, some or all of which may communicate with each other via an interlink (e.g., bus) 2708. The machine 2700 may further include a display device 2710, an alphanumeric input device 2712 (e.g., a keyboard), and a user interface (UI) navigation device 2714 (e.g., a mouse). In an example, the display device 2710, alphanumeric input device 2712, and UI navigation device 2714 may be a touch screen display. The machine 2700 may additionally include a mass storage device (e.g., drive unit) 2716, a signal generation device 2718 (e.g., a speaker), a network interface device 2720, and one or more sensors 2721, such as a Global Positioning System (GPS) sensor, compass, accelerometer, or another sensor. The machine 2700 may include an output controller 2728, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 2716 may include a machine-readable medium 2722 on which is stored one or more sets of data structures or instructions 2724 (e.g., software) embodying or utilized by any one or more of the techniques or functions described herein. The instructions 2724 may also reside, completely or at least partially, within the main memory 2704, within the static memory 2706, within the hardware processor 2702, or within the GPU 2703 during execution thereof by the machine 2700. In an example, one or any combination of the hardware processor 2702, the GPU 2703, the main memory 2704, the static memory 2706, or the mass storage device 2716 may constitute machine-readable media.

While the machine-readable medium 2722 is illustrated as a single medium, the term "machine-readable medium" may include a single medium, or multiple media, (e.g., a centralized or distributed database, and/or associated caches and servers) configured to store the one or more instructions 2724.

The term "machine-readable medium" may include any medium that is capable of storing, encoding, or carrying instructions 2724 for execution by the machine 2700 and that cause the machine 2700 to perform any one or more of the techniques of the present disclosure, or that is capable of storing, encoding, or carrying data structures used by or associated with such instructions 2724. Non-limiting machine-readable medium examples may include solid-state memories, and optical and magnetic media. In an example, a massed machine-readable medium comprises a machine-readable medium 2722 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2724 may further be transmitted or received over a communications network 2726 using a transmission medium via the network interface device 2720.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
accessing, by a computer system, a database to obtain values for a plurality of features associated with a fire in a geographical region, the plurality of features comprising one or more satellite images at a first resolution, vegetation information for the geographical region, and weather data for the geographical region, each satellite image comprising a plurality of first cells associated with the geographical region, the first resolution defining a first size of each first cell;
generating a map of the geographical region, the map comprising a plurality of second cells having a second size, the second size being smaller than the first size, the map of the geographical region having a higher resolution than a resolution of the one or more satellite images;
estimating, using a machine-learning model; probability values for the second cells in the map based on the plurality of features, each probability value indicating if the second cell contains an active fire;
updating the map of the geographical region based on the probability values for the second cells, and
causing presentation of the map in a user interface.

2. The method of claim 1, comprising:
before estimating the probability values, training the machine-learning model with values of the plurality of features from previous fires.

3. The method of claim 1, wherein the plurality of features comprises land-related features that include land use, slope, aspect, elevation, and soil moisture.

4. The method of claim 1, wherein the plurality of features comprises hour of the day, Normalized Difference Vegetation Index (NDVI), and Normalized Difference Built-up Index (NDBI).

5. The method of claim 1, wherein the vegetation information comprises canopy height, canopy cover, canopy bulk density, and drought index; wherein the weather data comprises wind, precipitation, temperature, humidity, and cloud cover.

6. The method of claim 1, comprising:
estimating, by the machine-learning model, second cells with embers that a ignite fires; and
presenting, in the map, an ember area with second cells that comprise embers that may ignite fires.

7. The method of claim 1, comprising:
estimating a fire scar area with second cells that have already burnt; and
causing presentation in the user interface of the map with the fire scar area.

8. The method of claim 1, wherein the one or more satellite images comprise images in a plurality of frequency bands.

9. The method of claim 1, wherein the first size is a square with 375 meter sides and the second size is a square with 30 meter sides.

10. The method of claim 1, comprising:
receiving observations about a state of the fire in the geographical region; and
updating the probability values for the second cells based on the received observations.

11. A system comprising:
a memory comprising instructions; and
one or more computer processors, wherein the instructions, when executed by the one or more computer processors, cause the one or more computer processors to perform operations comprising:
accessing a database to obtain values for a plurality of features associated with a fire in a geographical region, the plurality of features comprising one or more satellite images at a first resolution, vegetation information for the geographical region, and weather data for the geographical region, each satellite image comprising a plurality of first cells associated with the geographical region, the first resolution defining a first size of each first cell,
generating a map of the geographical region, the map comprising a plurality of second cells having a second size, the second size being smaller than the first size, the map of the geographical region having a higher resolution than a resolution of the one or more satellite images;
estimating, using a machine-learning model, probability values for the second cells in the map based on the plurality of features, each probability value indicating if the second cell contains an active fire;
updating the map of the geographical region based on the probability values for the second cells; and
causing presentation of the map in a user interface.

12. The system of claim 11, wherein the instructions cause the one or more computer processors to perform operations comprising:
before estimating the probability values, training the machine-learning model, with values of the plurality of features from previous fires.

13. The system of claim 11, wherein the plurality of features comprises land-related features that include land use, slope, aspect, elevation, and soil moisture; wherein the plurality of features comprises hour of the day, Normalized Difference Vegetation Index (NDVI), and Normalized Difference Built-up Index (NDBI).

14. The system of claim 11, wherein the vegetation information comprises canopy height, canopy cover, canopy bulk density, and drought index; wherein the weather data comprises wind, precipitation, temperature, humidity, and cloud cover.

15. The system of claim 11, wherein the instructions cause the one or more computer processors to perform operations comprising:
estimating; by the machine-learning model; second cells with embers that may ignite fires; and
presenting, in the map; an ember area with second cells with embers that may ignite fires.

16. A non-transitory machine-readable storage medium including instructions that, when executed by a machine, cause the machine to perform operations comprising:
accessing; by a computer system, a database to obtain values for a plurality of features associated with a fire in a geographical region, the plurality of features comprising one or more satellite images at a first resolution, vegetation information for the geographical region, and weather data for the geographical region, each satellite image comprising a plurality of first cells associated with the geographical region, the first resolution defining a first size of each first cell;

generating a map of the geographical region, the map comprising a plurality of second cells having a second size, the second size being smaller than the first size, the map of the geographical region having a higher resolution than a resolution of the one or more satellite images;

estimating, using a machine-learning model; probability values for the second cells in the map based on the plurality of features, each probability value indicating if the second cell contains an active fire;

updating the map of the geographical region based on the probability values for the second cells; and causing presentation of the map in a user interface.

17. The non-transitory machine-readable storage medium of claim 16, wherein the machine performs operations comprising:

before estimating the probability values, training the machine-learning model, with values of the plurality of features from previous fires.

18. The non-transitory machine-readable storage medium of claim 16, wherein the plurality of features comprises land-related features that include land use, slope, aspect, elevation, and soil moisture; wherein the plurality of features comprises hour of the day, Normalized Difference Vegetation Index (NDVI), and Normalized Difference Built-up Index (NDBI).

19. The non-transitory machine-readable storage medium of claim 16, wherein the vegetation information comprises canopy height, canopy cover, canopy bulk density, and drought index; wherein the weather data comprises wind, precipitation, temperature, humidity, and cloud cover.

20. The non-transitory machine-readable storage medium of claim 16, wherein the machine performs operations comprising:

estimating, by the machine-learning model, second cells with embers that may ignite fires; and presenting, in the map, an ember area with second cells with embers that may ignite fires.

* * * * *

UNITED STATES PATENT AND TRADEMARK OFFICE
CERTIFICATE OF CORRECTION

PATENT NO. : 11,202,926 B2
APPLICATION NO. : 16/197503
DATED : December 21, 2021
INVENTOR(S) : Tohidi et al.

It is certified that error appears in the above-identified patent and that said Letters Patent is hereby corrected as shown below:

In the Specification

In Column 5, Line 7, after "region", insert --.--

In Column 9, Line 27, delete "fire," and insert --fire;-- therefor

In Column 12, Line 39, delete "recent." and insert --recent,-- therefor

In Column 16, Line 17, delete "index." and insert --index,-- therefor

In Column 21, Line 32, delete "1976):" and insert --1976);-- therefor

In Column 21, Line 37, delete "2012:" and insert --2012;-- therefor

In the Claims

In Column 33, Line 32, in Claim 1, delete "model;" and insert --model,-- therefor In Column 33, Line 37, in Claim 1, delete "cells," and insert --cells;-- therefor In Column 33, Line 57, in Claim 6, delete "a" and insert --may-- therefor In Column 34, Line 23, in Claim 11, delete "cell," and insert --cell;-- therefor In Column 34, Line 57, in Claim 15, delete "estimating;" and insert --estimating,-- therefor In Column 34, Line 57, in Claim 15, delete "model;" and insert --model,-- therefor In Column 34, Line 59, in Claim 15, delete "map;" and insert --map,-- therefor Signed and Sealed this
Twenty-sixth Day of April, 2022

Katherine Kelly Vidal
*Director of the United States Patent and Trademark Office*

In Column 34, Line 64, in Claim 16, delete "accessing;" and insert --accessing,-- therefor In Column 35, Line 12, in Claim 16, delete "model;" and insert --model,-- therefor